(12) United States Patent
Hasegawa et al.

(10) Patent No.: US 6,735,244 B1
(45) Date of Patent: May 11, 2004

(54) DATA TRANSMISSION SYSTEM AND RECEIVER UNIT THEREOF

(75) Inventors: Kazutomo Hasegawa, Kawasaki (JP); Nobukazu Koizumi, Kawasaki (JP); Seiji Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 744 days.

(21) Appl. No.: 09/593,469

(22) Filed: Jun. 14, 2000

(30) Foreign Application Priority Data

Aug. 30, 1999 (JP) .......................................... 11-243503

(51) Int. Cl.[7] ................................................. H04B 1/38
(52) U.S. Cl. ........................ 375/219; 375/231; 375/346
(58) Field of Search ................................ 375/231, 232, 375/219, 222, 285, 346, 348, 350

(56) References Cited

U.S. PATENT DOCUMENTS

| | | | |
|---|---|---|---|
| 5,117,418 A | * 5/1992 | Chaffee et al. | ............. 370/289 |
| 5,285,474 A | 2/1994 | Chow et al. | |
| 5,479,447 A | 12/1995 | Chow et al. | |
| 5,995,568 A | * 11/1999 | Molnar et al. | ............... 375/354 |
| 6,456,654 B1 | * 9/2002 | Ginesi et al. | ............... 375/229 |
| 6,535,552 B1 | * 3/2003 | Pessoa | ........................ 375/231 |
| 6,556,623 B2 | * 4/2003 | Tzannes et al. | ............. 375/224 |

FOREIGN PATENT DOCUMENTS

EP 1 014 636 A2 * 6/2000

* cited by examiner

Primary Examiner—Young T. Tse
(74) Attorney, Agent, or Firm—Katten Muchin Zavis Rosenman

(57) ABSTRACT

A data transmission system which trains its internal equalizers both in an initialization phase and in a normal communication session. In a transmitter unit, a modulation unit modulates a data signal to be transmitted. This signal is sent out to a telephone subscriber line by a transmitter after being added a cyclic prefix by a prefixing unit. A receiver unit accepts the data signal at its receiver portion. The received signal, however, has been impaired because of non-ideal transmission characteristics of the subscriber line. The receiver unit employs a processor which serves as an equalizer to confine the signal impairment within a period of cyclic prefix of each symbol. The receiver unit further comprises a target channel which provides reference characteristics for use in adapting the processor to the current line characteristics. At an initialization stage, a first training unit performs training by tuning both the target channel and processor. When a normal communication session begins, a second training unit performs training by mainly tuning the processor.

18 Claims, 23 Drawing Sheets

DATA TRANSMISSION SYSTEM AND RECEIVER UNIT THEREOF

BACKGROUND OF THE INVENTION

1. Field of the Invention

The present invention relates to a data transmission system and a receiver unit therefor. More particularly, the present invention relates to a data transmission system which transports data between a transmitter unit and a receiver unit over a telephone subscriber loop, as well as to the receiver unit used in this system.

2. Description of the Related Art

In recent years, the use of multimedia communication services such as the Internet has become increasingly ubiquitous in our daily activities, both at work and at home. To meet such user requirements, there is an urgent need to provide highly reliable, cost effective digital access network systems. However, constructing a completely new telecommunication infrastructure for multimedia services is extremely costly and time consuming. This has motivated various proposals of new high-speed data communication techniques that use existing telecommunication networks. Digital Subscriber Lines (xDSL), for example, are known as one of the enabling technologies for high-speed data communications over plain old phone lines. This xDSL technology is a collection of signal transmission techniques using subscriber lines, and in another aspect, it is an advanced modulation/demodulation technique. Such XDSL techniques are broadly divided into two groups: ones that provide symmetric upstream and downstream transmission rates, and ones that provide asymmetric rates. Here, the term "upstream" refers to the direction from a subscriber's premises to its nearest central office, and the "downstream" refers to the opposite direction. The ITU-T recommendations for Asymmetric DSL (ADSL) include the following two versions: G.992.1 (G.dmt) for a downstream transmission rate of about 6 Mbps, and G.992.2 (G.lite) for about 1.5 Mbps. Both versions use Discrete Multitone (DMT) techniques for signal modulation.

(1) DMT Modulation System

Conventional DMT modulation techniques will be described below with reference to FIG. 14, focusing on the downstream signal modulation and demodulation in a G.lite-based ADSL system. The upper half of FIG. 14 shows a transmitter unit which comprises: a serial-to-parallel buffer 10, an encoder 20, an IFFT unit 30, a parallel-to-serial buffer 40, a D/A converter 50, and a transmission bit map 60. The serial-to-parallel buffer 10 stores transmission data for a single symbol period of 250 microseconds (i.e., the reciprocal of a symbol rate 4 kHz) and converts it into a parallel data format. The encoder 20 applies a prescribed modulation processing to the parallel data supplied from the buffer 10. The inverse fast Fourier transform (IFFT) unit 30 processes the output data of the encoder 20 using IFFT algorithms. The parallel-to-serial buffer 40 converts the transformed data back into a serial data format, as well as adding a cyclic prefix (described later) to each symbol. The digital-to-analog (D/A) converter 50 converts the serial data to an analog signal at a sampling rate of 1.104 MHz and outputs it to a metallic subscriber line 70. The transmission bit map 60 is an allocation table describing how many data bits should be assigned to each DMT carrier. This table is called the "bit map" in the ADSL terminology.

The lower half of FIG. 14 shows a receiver unit, which comprises: an A/D converter 80, a TEQ unit 90, a buffer 100, an FFT unit 110, an FEQ unit 120, a decoder 130, a parallel-to-serial buffer 140, a reception bit map 150, and a TEQ training block 160. The analog-to-digital (A/D) converter 80 receives a DMT-modulated analog signal transmitted over the metallic subscriber line 70 and converts it into digital form at a sampling rate of 1.104 MHz. The time domain equalizer (TEQ) unit 90 then processes this digital data signal in a prescribed manner, so that intersymbol interference (ISI) to a cyclic prefix, which has been added at the parallel-to-serial buffer 40, will settle within the period of that cyclic prefix. The serial-to-parallel buffer 100 converts the output data of the TEQ unit 90 into parallel data, after removing a cyclic prefix from each symbol. The fast Fourier transform (FFT) unit 110 converts the output data of the serial-to-parallel buffer 100 into parallel data signals in the frequency domain by using FFT algorithms. The frequency domain equalizer (FEQ) unit 120 equalizes those frequency-domain data signals according to the transmission characteristics (or frequency response) of the metallic subscriber line 70. The decoder 130 demodulates the output data of the FEQ unit 120 in a prescribed manner. The parallel-to-serial buffer 140 receives parallel data from the decoder 130 and converts it into serial data. As the counterpart of the transmission bit map 60, the reception bit map 150 stores information about the number of data bits assigned to each carrier at the sending end. Based on this information, a decoder 130 and parallel-to-serial buffer 140 decodes the received data. The TEQ training block 160 adjusts the characteristics of the TEQ unit 90, with reference to the output signals of the FFT unit 110.

The above-described conventional system operates as follows. The transmitter unit accepts data to be transmitted at the serial-to-parallel buffer 10, which actually stores data bits for a single symbol period of 250 microseconds (i.e., the reciprocal of the symbol rate 4 kHz). Those stored data bits are divided into groups according to the bit allocation previously defined in the transmission bit map 60. They are then supplied to the encoder 20, which maps each given bit sequence to specific code points in the signal constellation of quadrature amplitude modulation. Those constellation points are passed to the IFFT unit 30. The IFFT unit 30 performs inverse fast Fourier transform to accomplish the quadrature amplitude modulation of each constellation point. The data signal modulated in this way is then output to the parallel-to-serial buffer 40. Note here that the DMT modulation is realized by a combination of the encoder 20 and IFFT unit 30.

The parallel-to-serial buffer 40 now chooses the 240th to 255th samples of the IFFT output data and adds a copy of those sixteen samples to the beginning of a DMT symbol. This is called the "cyclic prefix," the details of which will appear in a later section. The symbol data with a cyclic prefix is now sent from the parallel-to-serial buffer 40 to the D/A converter 50. The D/A converter 50 converts it into an analog signal at the sampling rate of 1.104 MHz and transmits it toward the remote subscriber over the metallic subscriber line 70.

At the subscriber's end, the A/D converter 80 converts the received signal to a digital data signal at the rate of 1.104 MHz and supplies it to the TEQ unit 90. This digital data signal has been impaired with intersymbol interference. The TEQ unit 90 processes it in such a way that the effect of intersymbol interference will be confined within a limited period of the 16-sample cyclic prefix. The processed signal is then stored in the serial-to-parallel buffer 100, the length of which is one DMT symbol period. The serial-to-parallel buffer 100 converts this signal into parallel form, removing a cyclic prefix from each symbol. The FFT unit 110 demodulates the resultant parallel data signals with fast Fourier transform algorithms, thereby reproducing the original constellation points. Those reproduced constellation points are then fed to the FEQ unit 120 to compensate for the amplitude and phase distortion that has occurred during the travel over the metallic subscriber line 70. This equalization is performed for individual carriers having different frequencies. The decoder 130 then decodes the equalized signals according to the reception bit map 150, which is identical to the transmission bit map 60. (More details will be provided in a later section, about the signal processing path from the TEQ unit 90 to the decoder 130.) Finally, the decoded data signals are stored into the parallel-to-serial buffer 140, and the resulting serial bit stream is output as fully decoded receive data. The FFT unit 110 also supplies constellation points to the TEQ training block 160 for training the TEQ unit 90. The TEQ training block 160 uses them to determine a set of parameters that characterize the TEQ unit 90.

(2) Crosstalk From TCM-based ISDN Services

The performance of an ADSL line is affected by ISDN signals transmitted in adjacent lines because of their coupling effects. This impairment is known as crosstalk interference, and the following problem (referred to herein as "TCM crosstalk") will occur in the case of ISDN lines using a time compression multiplexing (TCM) technique, or "ping pong" method.

TCM-based ISDN systems are designed to operate in synchronization with a 400 Hz timebase signal 210, as depicted in section (A) of FIG. 15. Downstream data is sent from the central office to the subscriber during the first half cycle of the timebase signal 210, while upstream data is sent from the subscriber to the central office during the second half cycle. For this reason, the ADSL equipment at the central office encounters near end crosstalk (NEXT) 220 from local ISDN transmitters during the first half cycle of the 400 Hz timebase signal 210, as well as suffering far end crosstalk (FEXT) 230 from upstream signals transmitted by the subscriber's ISDN equipment during the second half cycle, as shown in section (B) of FIG. 15. The subscriber's ADSL equipment, in turn, suffers FEXT 240 during the first half cycle of the timebase signal 210 and NEXT 250 during the second half cycle, as shown in section (C) of FIG. 15.

In this specification of the invention, those particular periods where the system suffers NEXT and FEXT interference are called "NEXT periods" and "FEXT periods," respectively. Generally, the severity of interference is higher in a NEXT period, compared to that in a FEXT period; part (D) of FIG. 15 indicates such NEXT and FEXT periods as viewed from the subscriber side.

(3) Sliding Window

The concept of "sliding window" has been introduced so as to provide a practical digital subscriber line system which can send ADSL signals with higher quality even in such an environment where the above-described TCM crosstalk is prevalent. The sliding window is used to identify the FEXT periods, in which the magnitude of noise interference is relatively small. By effectively utilizing such FEXT periods, the system can reliably transport data to the destination, with minimum interference of crosstalk noises.

Consider, for example, an ADSL signal being transmitted downstream from an office-side ADSL transmission unit (ATU-C) to a subscriber-side ADSL transmission unit (ATU-R). In this situation, the sliding window indicates the state of the ADSL signal as follows. That is, as shown in section (E) of FIG. 15, the sliding window 270 indicates that some symbols are within a FEXT period in their entirety, when viewed from the subscriber's end. The ATU-C then sends those symbols to the ATU-R as "inside symbols." The other symbols are included within a NEXT period in their entirety or in part, and thus the ATU-C sends them as "outside symbols." This transmission technique is called the "dual bit map" method, since two different bit maps are used to modulate and demodulate the inside and outside symbols. The same method applies to the upstream direction; the ATU-R at the subscriber's end transmits DMT symbols according to the sliding window.

It should be noted here that there is another operation mode in which the ADSL system uses only one bit map in a FEXT period. This is called "single bit map mode," or "FEXT bit map mode." During the period outside the sliding window, in FEXT bit map mode, the ATU-C transmits solely a pilot tone in the downstream direction for timing synchronization purposes, while the ATU-R transmits nothing in the upstream direction.

(4) Frame Structure

The concept of "hyperframe" has been introduced in order to provide a digital subscriber line system which can send ADSL signals with higher quality even in a TCM-crosstalk-prevalent environment described above. In the ADSL techniques, one frame corresponds to one symbol, and one superframe consists of 69 frames as shown in section (C) of FIG. 16. More specifically, those 69 frames 320 include 68 data frames and one special frame containing a synchronization symbol (S) in a normal communication session. As section (B) of FIG. 16 indicates, five superframes make a single hyperframe.

A synchronization frame may contain an inverse synchronization symbol (I), instead of the synchronization symbol (S) mentioned above. In the example shown in section (B) of FIG. 16, the fourth superframe carries an inverse synchronization symbol. FIG. 17 shows the difference between those two symbols. The inverse synchronization symbol (I) is 180-degree out of phase with the synchronization symbol (S) for DMT carriers other than the pilot tone, as shown in section (B) of FIG. 17. For the pilot tone, they are in phase with each other as shown in section (A) of FIG. 17. The inverse synchronization symbol (I) is inserted in this way, making it possible for the receiver to recognize which superframe it is receiving.

Referring back to part (B) of FIG. 16, a downstream ADSL hyperframe is transmitted from ATU-C to ATU-R. In this case, the ADSL specification stipulates that an inverse synchronization symbol (I) be placed at the fourth superframe in a hyperframe. In contrast to this, the specification requires that the upstream hyperframe should contain an inverse synchronization symbol in its first superframe. Section (A) of FIG. 16 shows a 400 Hz timebase signal 310 used by the aforementioned TCM-based ISDN services. The ADSL hyperframe is synchronized with every 34 cycles of this timebase signal 310.

(5) Equalizer

Equalizers used in the above-described ADSL receiver units include a time domain equalizer (TEQ) and a frequency domain equalizer (FEQ). The parallel-to-serial buffer 40 shown in FIG. 14 receives DMT symbols, each of which is represented by a simple rectangle in section (A) of FIG. 18. The buffer 40 modifies this DMT symbol, adding a copy of its last 16 samples to the beginning of the symbol, as shown in section (B) of FIG. 18. The added part is referred to as a "cyclic prefix," and the DMT symbol with such a cyclic prefix is sent to the D/A converter 50 so as to be converted to an analog signal at the sampling rate of 1.104 MHz, as shown in section (C) of FIG. 18. This analog signal is transmitted to the subscriber's premises over the metallic subscriber line 70. The signal reaching the subscriber's premises is distorted as a result of intersymbol interference as shown in section (D) of FIG. 18. This is because of a non-ideal frequency response of the metallic subscriber line 70 which exhibits uneven amplitude and delay (phase) characteristics. Such intersymbol interference, however, is compressed within a 16-sample cyclic prefix through an equalization process provided by the TEQ unit 90 shown in FIG. 14, resulting in a waveform conceptually depicted in section (E) of FIG. 18. After that, the distorted cyclic prefix is removed at the serial-to-parallel buffer 100, thus yielding a clean DMT symbol with no effect of intersymbol interference.

In the way outlined above, the TEQ unit 90 eliminates the effect of intersymbol interference from the received signal by manipulating cyclic prefixes. More specifically, the metallic subscriber line 70 has non-linear low-pass characteristics, which cause deterioration of transmission signals at higher frequency bands. On the other hand, the data signal being transmitted shows discontinuity between adjacent symbols. This discontinuity in the data signal causes an impulse response lasting for a certain time duration, when the signal passes through the above non-linear transmission channel. (Here, the term "impulse response" refers to the waveform that results at the output of the channel when its input is excited by an impulse.) Being superimposed on the main components of the data signal, the above impulse response will lead to signal deterioration. To solve this problem, a cyclic prefix is attached to the beginning of each symbol by copying the last 16 samples of the symbol. This ensures continuity at a point where the prefix and symbol are joined, thus causing no unwanted impulse response in that part. On the other hand, the signal may still be discontinuous at the point where the beginning of the cyclic prefix is joined with the end of the previous symbol, which could cause an undesired impulse response. Fortunately, the interference at the latter part can be eliminated by (1) subjecting the received data signal to the TEQ unit 90 having a high-pass characteristic that works inversely with the low-pass characteristic of the metallic subscriber line 70, so that the impulse response will settle within the period of a cyclic prefix, and (2) removing the cyclic prefix, together with its distortion. In this way, the receiver unit decouples the received data signal from the effect of an unwanted impulse response, thus yielding its original waveform.

While the above-described TEQ unit 90 operates in the time domain, the FEQ unit 120 works in the frequency domain. That is, the FEQ unit 120 performs equalization of the decoded output of the FFT unit 110 (FIG. 14) which contains multiple carriers having different frequencies. Separately for each individual carrier, the FEQ unit 120 compensates for amplitude and phase distortions of a transmission signal, which were incurred during the travel over the metallic subscriber line 70.

(6) TEQ Training Algorithm in Frequency Domain

The TEQ unit 90 is actually a finite impulse response (FIR) filter which operates as a channel equalizer in the time domain. As shown in section (E) of FIG. 18, the TEQ unit 90 should be designed so that intersymbol interference will completely settle within a cyclic prefix having a length of sixteen sample periods, and to this end, the TEQ unit 90 has to be tuned in an adaptive manner.

Referring now to FIG. 19, an example of such adaptive algorithms for the TEQ unit 90 will be described below. While the system of FIG. 19 shares some elements with that of FIG. 14, the following explanation will focus on its distinctive points, affixing like reference numerals to like elements. Also, a series of elements from the IFFT unit 30 to the D/A converter 50 shown in FIG. 14 are now represented collectively as a single block 500 named "transmitter unit" in FIG. 19. Further, while FIG. 14 represents the TEQ training block 160 as a single functional unit, FIG. 19 shows it as a collection of more specific functional blocks. They include: a reference signal generator 610, a target channel 620, and an adder 630. It should also be noted that FIG. 19 omits the A/D converter 80 and serial-to-parallel buffer 100 for simplicity of explanation.

In FIG. 19, the transmitter unit 500 is sending a signal X for use in a training process of the TEQ unit. 90. In the receiver unit 600, the same signal X is produced locally by the reference signal generator 610, which is called the reference signal X. The target channel 620 serves as a target to be referenced when training the TEQ unit 90. The adder 630 calculates the difference E between the output Z of the FFT unit 110 and the output BX of the target channel 620, and supplies the result to the TEQ unit 90 and target channel 620.

The above elements will operate as follows. The signal X transmitted by the transmitter unit 500 propagates through the metallic subscriber line 70, during which the amplitude and phase of its frequency components are varied. The TEQ unit 90 equalizes the received signal to compensate for the distortion introduced during its travel over the metallic subscriber line 70. The signal equalized as such in the time domain is then fed to the FFT unit 110 and converted into a frequency domain signal. The output of the FFT unit 110 is supplied to the adder 630. The reference signal generator 610, on the other hand, produces a reference signal X that corresponds to the transmission signal X. The target channel 620 multiplies each frequency component of the reference signal X by a predetermined coefficient. The adder 630 calculates the difference between the outputs of the FFT unit 110 and target channel 620, and feeds the result back to the TEQ unit 90 and target channel 620. Based on this difference signal, the TEQ unit 90 and target channel 620 adjust their coefficient values. More specifically, the adder 630 calculates the difference E between the output Z of the FFT unit 110 and the output BX of the target channel 620 when it is given a reference signal X, and then the TEQ unit 90 and target channel 620 are alternately adjusted in such a way that the following two conditions are both fulfilled. They are: (1) the length of the impulse response should be at most 16 sampling periods, and (2) the difference E (i.e., Z−BX) should be zero. As a result of this training process, the TEQ unit 90 obtains intended characteristics which confine the intersymbol interference within a 16-sample-long cyclic prefix of each received symbol, as shown in section (E) of FIG. 18. Note that the characteristic of the target channel 620 finally agrees with a combined characteristic of the metallic subscriber line 70 and TEQ unit 90.

(7) TEQ Training Algorithm in Time Domain

While FIG. 19 has illustrated an implementation of the training algorithm in the frequency domain, it is also possible to realize the same in the time domain. FIG. 20 shows a system designed to train the TEQ unit 90 in the time domain by using a generally known training algorithm. Basically, those two training systems shown in FIGS. 19 and 20 operate in the same way, although they are designed to work in different domains. Unlike its counterpart shown in FIG. 19, however, the time-domain system of FIG. 20 employs a delay unit 720, while eliminating the FFT unit 110.

The system of FIG. 20 further comprises a reference signal generator 710 and a target channel 730, both of which operate in the time domain. The reference signal generator 710 produces a time domain signal x(t) which is equivalent to what is converted from the transmission signal X. The delay unit 720 adds a predetermined amount of delay to the reference signal x(t) supplied from the reference signal generator 710. The target channel 730 is used as a target to be referenced when tuning the characteristic of the TEQ unit 90. It outputs a signal b(t)*x(t), where the function b(t) represents the characteristics of the target channel 730 itself, and the asterisk (*) denotes the convolution operator. This means that the target channel 730 calculates a convolution integral of the delayed reference signal x(t) with the target transmission characteristics b(t). The adder 630 calculates the difference between the output z(t) of the TEQ unit 90 and the output b(t)*x(t) of the target channel 730. The result is fed back to the TEQ unit 90 and target channel 730. Based on this difference signal, the TEQ unit 90 and target channel 730 adjust themselves in such a way that the error output e(t) of the adder 630 will be zero.

The above-described conventional system operates as follows. When a signal X is transmitted at the sending end, its frequency components are varied during the transport over the metallic line 70. The TEQ unit 90 thus performs equalization of the received signal to compensate for the distortion. The resultant signal z(t) is then fed to the adder 630. On the other hand, the reference signal generator 710 produces a time-domain reference signal x(t), which is equivalent to the transmission signal X. The delay unit 720 delays this reference signal x(t) by a predetermined time interval, such that the output z(t) of the TEQ unit 90 will be in phase with that of the target channel 730. The target channel 730 convolves the reference signal x(t) with a combined characteristic b(t) of the metallic subscriber line 70 and TEQ unit 90 (excluding the delay time of the metallic subscriber line 70). The result of this convolution integral b(t)*x(t) is then supplied to the adder 630. The adder 630 calculates the difference e(t) between the output z(t) of the TEQ unit 90 and the output b(t)*x(t) of the target channel 730. The result is fed back to the TEQ unit 90 and target channel 730. Based on this result, the TEQ unit 90 and target channel 730 adjust themselves in an adaptive way. That is, the TEQ unit 90 and target channel 730 perform training operations alternately so that the error output e(t) of the adder 630 will be zero. As a result of this process, the TEQ unit 90 obtains intended characteristics, thus confining the intersymbol interference within a 16-sample-long cyclic prefix of each received symbol, as shown in section (E) of FIG. 18.

(8) FEQ Training Algorithm

Referring now to FIG. 21, an example of FEQ training algorithms will be described below. FEQ unit is an equalizer operating in the frequency domain. Since the DMT modulation uses multitone carriers, it is actually configured as a collection of equalizers for individual carriers having different frequencies in such a way that uniform characteristics will be provided over various tones.

FIG. 21 shows a combination of an FEQ unit 840 and a decoder 850, which correspond to the FEQ unit 120 and decoder 130 in FIG. 14, respectively. The FEQ unit 840 comprises a multiplier 810 which multiplies a given input signal Yi by a coefficient Wi. The values of the coefficients Wi are varied depending on the output of the adder 830. The decoder 850 comprises a decision unit 820 which outputs an estimated value Xi by guessing what the input signal Yi is likely to be. The adder 830 calculates the difference between the output Xi of the decision unit 820 and the output Zi of the multiplier 810, and based on the difference value, it determines the coefficients Wi for the multiplier 810.

The above conventional equalizer operates as follows. Multiple carrier signals are modulated by the transmitter unit and transmitted over the metallic subscriber line 70. When they reach the receiving end, those carrier signals exhibit some distortion in their amplitude and phase values because of the non-ideal characteristics of the metallic subscriber line 70. The FEQ unit 120 compensates for such distortion of each individual carrier signal. To this end, the FEQ unit 120 provides as many equalization circuits of FIG. 21 as the number of carriers, and each such circuit employs its local decoder 130 to produce an estimated value and compensate for the deterioration in a particular carrier frequency band. That is, in order for the FEQ unit 120 to compensate for the amplitude and phase distortion, each individual equalization circuit (FIG. 21) has to work in an adequate manner in its own carrier frequency band. To this end, the circuit is configured as follows: (1) each FEQ unit 840 provides its output Zi to the corresponding decoder 850, thus yielding an estimated value Xi; (2) the adder 830 calculates the difference Ei between the estimated value Xi and FEQ output Zi; and (3) the coefficients Wi of the multiplier 810 are controlled so that the difference Ei will be zero. The decoder 850 further converts the estimated value Xi into data bits bi and supplies them to the parallel-to-serial buffer 140 (FIG. 14).

(9) Frame Synchronization

FIG. 22 outlines an initialization sequence to start up an ADSL transmission unit. As indicated in FIG. 22, signals transmitted at this initialization stage 900 include continuous signals 910 and discontinuous signals 920. More specifically, in the first half of the initialization stage 900, the ADSL unit transmits continuous signals 910 such as repetitive synchronization symbols, and in the second half, it transmits discontinuous signals 920 such as wideband synchronization symbols.

When sending discontinuous signals, it is necessary for the transmitter unit to add a cyclic prefix to each DMT symbol to send, to enable the receiver unit to eliminate the effect of intersymbol interference from the received DMT symbols, as shown in section (C) of FIG. 18. However, when sending continuous signals, the transmitter unit can use DMT symbols with no cyclic prefix as shown in section (A) of FIG. 18. That is, there is no need to add a cyclic prefix to DMT symbols in the latter case, because continuous signals do not suffer from intersymbol interference.

The receiver unit has to synchronize itself to the timing of transmission frames to identify and extract each incoming symbol correctly from the received signal. When a continuous signal is being transmitted, the receiver unit can identify DMT symbols at any phase. In the case of discontinuous signals, however, correct DMT symbols can be identified only at one particular phase. Frame synchronization should therefore be established during an initialization stage where the transmission signal is continuous, so that the receiver unit will be able to correctly receive DMT symbols in a later communication session. More specifically, the receiver unit first captures the phase of DMT symbols at an initialization stage during which a continuousness transmission signal is provided, as shown section (A) of FIG. 23. It then attempts frame synchronization by shifting the captured phase as shown in section (B) of FIG. 23, so that DMT symbols can be extracted from discontinuous signals.

As FIG. 22 shows, the frame synchronization is performed after the TEQ training is completed, for the following reason. The TEQ unit adds some amount of delay, and this delay should also be considered as one of the parameters that affect the frame synchronization.

(10) Equalizer Training in TCM Crosstalk-prevalent Environment

For correct transport of ADSL signals, it is desired that both the aforementioned TEQ unit 90 and FEQ unit 120 are optimized in such environments where TCM crosstalk interference is prevalent, whether the system is in an initialization stage or in a normal communication session. One example of training algorithms for TEQ and FEQ units at an initialization stage in TCM crosstalk-prevalent environments is proposed in Japanese Patent Application No. 10-172464 (1998). According to this patent application, when performing equalizer training, the receiver unit refers to inside symbols in FEXT bit map mode (single bit map mode), whereas it refers only to inside symbols, or successively refers to both inside and outside symbols in dual bit map mode. In the case that both inside and outside symbols are used in dual bit map mode, the coefficient updating step size for outside symbols should be set to the vicinity of zero (i.e., zero or a sufficiently small value).

As clarified above, the time domain equalizer has to be adequately characterized through a training process, so that the intersymbol interference will be confined within a 16-sample-long cyclic prefix. However, the equalizer could lose its performance during a long time operation because of changes in temperature and consequent variations in the characteristics of a metallic subscriber line being used. Thus, to maintain the optimal performance during a normal data communication session, it is necessary to continue some processing to adapt the equalizer even after the initialization sequence is finished. However, no practical methods have been proposed so far to meet this requirement.

Another problem is that the training process in the initialization sequence consumes a large amount of processing resources and time, while the equalizer training is an essential process to obtain a good TEQ characteristic.

Still another problem with the conventional systems is the lack of training algorithms in an environment where TCM crosstalk interference is prevalent. Although some algorithms for use in the initialization phase are available, as described earlier in item (10), no practical algorithms or implementation methods have been proposed for how to train the equalizer during normal data communication sessions.

SUMMARY OF THE INVENTION

Taking the above into consideration, an object of the present invention is to provide a data transmission system which reliably trains its equalizers both in an initialization phase and in a normal communication session.

To accomplish the above object, according to the present invention, there is provided a data transmission system which uses a subscriber line to transport data from a transmitter unit to a receiver unit. In this system, the transmitter unit comprises the following elements: a modulator which applies a prescribed modulation on a data signal to be transmitted; a prefixing unit which adds a cyclic prefix to the data signal modulated by the modulator; a transmitter which sends the data signal with the cyclic prefix over the subscriber line. The receiver unit, on the other hand, comprises the following element: a receiver which receives the data signal sent from the transmitter; a processor which processes the data signal received by the receiver so that impairment introduced in the received data signal will be confined within the cyclic prefix, where the impairment has been introduced during the transport of the data signal over the subscriber line; a target channel which provides reference characteristics for use in training the processor; a first training unit which performs training at an initialization stage by tuning both of the target channel and the processor; and a second training unit which performs training by tuning the processor when a normal communication session takes place.

Further, another object of the present invention is to provide a receiver unit which maintains the performance of equalizers with reduced processing time and loads.

To accomplish this second object, according to the present invention, there is provided a receiver unit which receives data sent from a transmitter unit over a subscriber line. This receiver unit comprises the following elements: a receiver which receives a data signal sent from the transmitter unit; a processor which processes the data signal received by the receiver so that impairment introduced in the received data signal will be confined within a cyclic prefix, where the impairment has been introduced during the transport of the data signal over the subscriber line; a target channel which provides reference characteristics for use in training the processor; a first training unit which performs training at an initialization stage by tuning both of the target channel and the processor; and a second training unit which performs training by tuning the processor when a normal communication session takes place.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Several preferred embodiments of the present invention will be described below with reference to the accompanying drawings.

Figure 1:
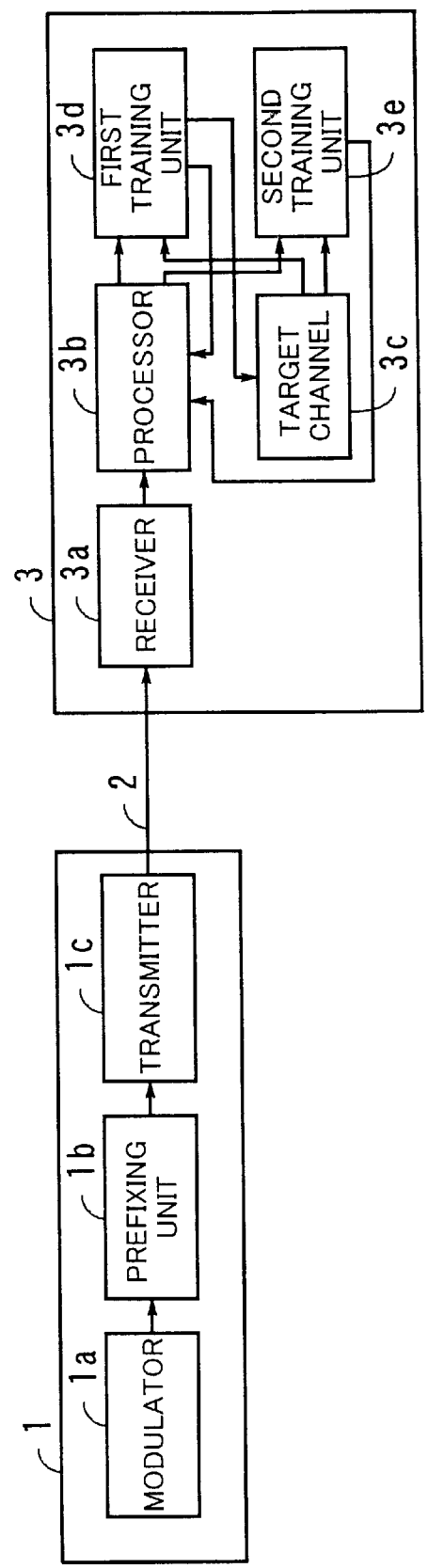
FIG. 1 is a conceptual view of the present invention.

FIG. 1 is a conceptual view of the present invention, where a transmitter unit 1 sends data to a receiver unit 3 over a metallic subscriber line 2. The metallic subscriber line 2 is an existing telephone line laid for public telecommunication services, etc., which serves as a medium for transporting a data signal from the transmitter unit 1 to the receiver unit 3. The receiver unit 3 receives the data signal transmitted over the metallic subscriber line 2, and restores the data signal to its original form.

The transmitter unit 1 comprises a modulator 1a, a prefixing unit 1b, and a transmitter 1c. The modulator 1a applies a prescribed modulation process (e.g., DMT) to a data signal to be transmitted. The prefixing unit 1b adds a cyclic prefix to each symbol of the modulated data signal (e.g., DMT symbols in this case). More specifically, the prefixing unit 1b selects the last n bits of each symbol constituting the modulated data and puts its copy to the beginning of that symbol, where n is an integer (e.g., n=16). The transmitter 1c sends out the data signal with such cyclic prefixes to the metallic subscriber line 2.

The receiver unit 3, on the other hand, comprises a receiver 3a, a processor 3b, a target channel 3c, a first training unit 3d, and a second training unit 3e. The receiver 3a receives a data signal that is sent by the transmitter 1c in the transmitter unit 1. While the received data signal is distorted during the transport over the metallic subscriber line 2, the processor 3b processes the signal so that the distortion of each symbol will be confined within the period of its cyclic prefix. The target channel 3c has such a characteristic that is regarded as a reference when training the processor 3b. According to this reference characteristic, the target channel 3c processes a given reference signal, and supplies the result to the first training unit 3d and second training unit 3e. Here, the reference signal is provided by a reference signal generator which is not shown in FIG. 1. The first training unit 3d performs a training process by tuning both the target channel 3c and the processor 3b when the receiver unit 3 begins communication (i.e., at the initialization stage). The second training unit 3e performs a like training process by tuning mainly the processor 3b in a normal communication session.

Assuming that the training units operate in the frequency domain, the following section will now explain the operation of the above-described system.

Suppose here that the transmitter unit 1 has called up the receiver unit 3 and a circuit has been established between those two parties. The transmitter unit 1 and receiver unit 3 first invoke an initialization process, negotiating the details of communication schemes and various parameters. At this stage, the processor 3b performs an equalizer training process as follows. The receiver 3a receives a reference signal (e.g., synchronization symbols) from the transmitter unit 1, and the processor 3b applies a predefined process to this reference signal. Because the initialization has not been completed at this stage, the processor 3b applies what is defined as a default process. The reference signal is received and processed in this way and passed to the first training unit 3d.

On the other hand, the target channel 3c receives a like reference signal from a reference signal generator (not shown). The target channel 3c processes this reference signal with its prescribed characteristics, which serve as a reference model in the training processes. Because the initialization is not completed at this stage, the target channel 3c provides its default characteristics.

The first training unit 3d calculates the difference between the outputs of the target channel 3c and processor 3b. It alternately trains the processor 3b and target channel 3c in such a way that the difference will become zero, and that the duration of impulse response of the target channel 3c will be within 16 sample periods. This adjustment provides the processor 3b with a desirable characteristic adapted to the metallic subscriber line 2, so that the disturbance caused by the metallic subscriber line 2 will be confined within a cyclic prefix. As a result of the above, the target channel 3c obtains characteristics that are equal to the combined characteristics of the metallic subscriber line 2 and processor 3b.

The training of the processor 3b is followed by a frame synchronization process, and after that, the transmitter unit 1 and receiver unit 3 start to communicate in a normal mode of operation. Even in this normal communication session, however, the metallic subscriber line 2 may exhibit some variations in its characteristics as time goes by. If this happens, the processor 3b can no longer maintain its advantage of optimized compensation, thus causing degradation in the quality of communication. According to the present invention, the data transmission system is configured to fix the characteristic of the target channel 3c after the frame synchronization is finished, thus maintaining its state established by the training process at the initialization stage. The system is also configured to follow the variations in a normal communication mode by activating the second training unit 3e to adjust the processor 3b in an appropriate manner. Once the system starts a normal communication session after initialization, the second training unit 3e extracts a reference signal (e.g., synchronization symbol), which has been received by the receiver 3a and processed by the processor 3b in a prescribed manner. The target channel 3c is receiving at this moment a like reference signal from a reference signal generator (not shown). With the given characteristic, the target channel 3c processes this reference signal and supplies the result to the second training unit 3e. The second training unit 3e now calculates the difference between the outputs of the target channel 3c and processor 3b, and adjusts the processor 3b in such a way that the difference will stay zero. In general, the target channel 3c is implemented as a finite impulse response (FIR) filter. Even if the amount of reception delay is varied as a result of frame synchronization, those FIR filters can easily adapt themselves to such variations by changing their coefficients' order according to the increased or decreased delay.

As described above, according to the present invention, the data transmission system is configured to keep adaptive to variations in normal communication sessions by activating the second training unit 3e to solely adjust the processor 3b, while fixing the characteristics of the target channel 3c which has been established at the initialization stage. This configuration permits the system to maintain the quality of data communication.

The following section will now describe a specific embodiment of the present invention.

Figure 2:
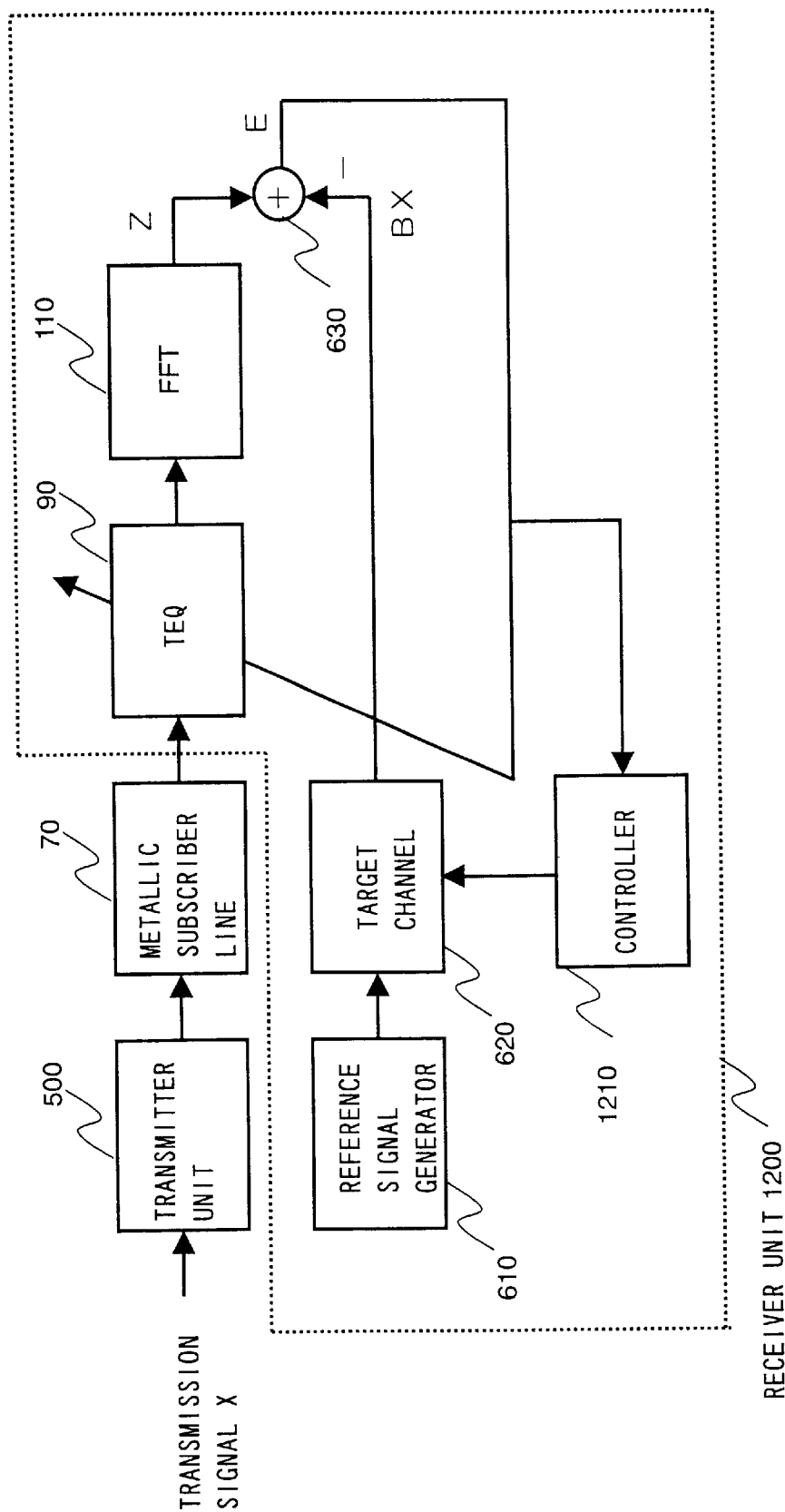
FIG. 2 is a block diagram of a first embodiment of the present invention.

FIG. 2 is a block diagram which shows a typical configuration of data transmission system of the present invention. Since the structure shown in this FIG. 2. is similar to the conventional system described earlier in FIG. 19, the following explanation will focus on its distinctive elements, while affixing like reference numerals to like elements. Compared with the conventional system of FIG. 19, the proposed system newly employs a controller 1210, while other elements can also be seen in FIG. 19. As will be described later, this controller 1210 controls a target channel 620 and other elements, referring to the output of an adder 630.

The operation of the present embodiment will now be described below. Suppose that the transmitter unit 500 called up the receiver unit 1200 and a circuit has been established between those two parties. The receiver unit 1200 then begins an initialization process. During this process, the controller 1210 supplies the target channel 620 with the output signal of the adder 630, causing the target channel 620 to adapt to the characteristics of the metallic subscriber line 70. The details of this equalizer training will not be described here again, since it is similar to what has been explained in FIG. 19. In the embodiment shown in FIG. 2 target channel 3c is shown as target channel 620, the first and second training units 3d and 3e of FIG. 1 are implemented as a combination of FFT unit 110 which converts or transforms the signal received from the transmitting unit and processed in TEQ unit 90, reference signal generator 610 in which a frequency-domain reference signal which is equivalent to the reference signal from the transmitter unit is produced locally, a controller 1210 which, with adder 630, sets up the target channel or TEQ unit 90 or both according to a difference between the outputs of FFT unit 110 and target channel 620.

Figure 3:
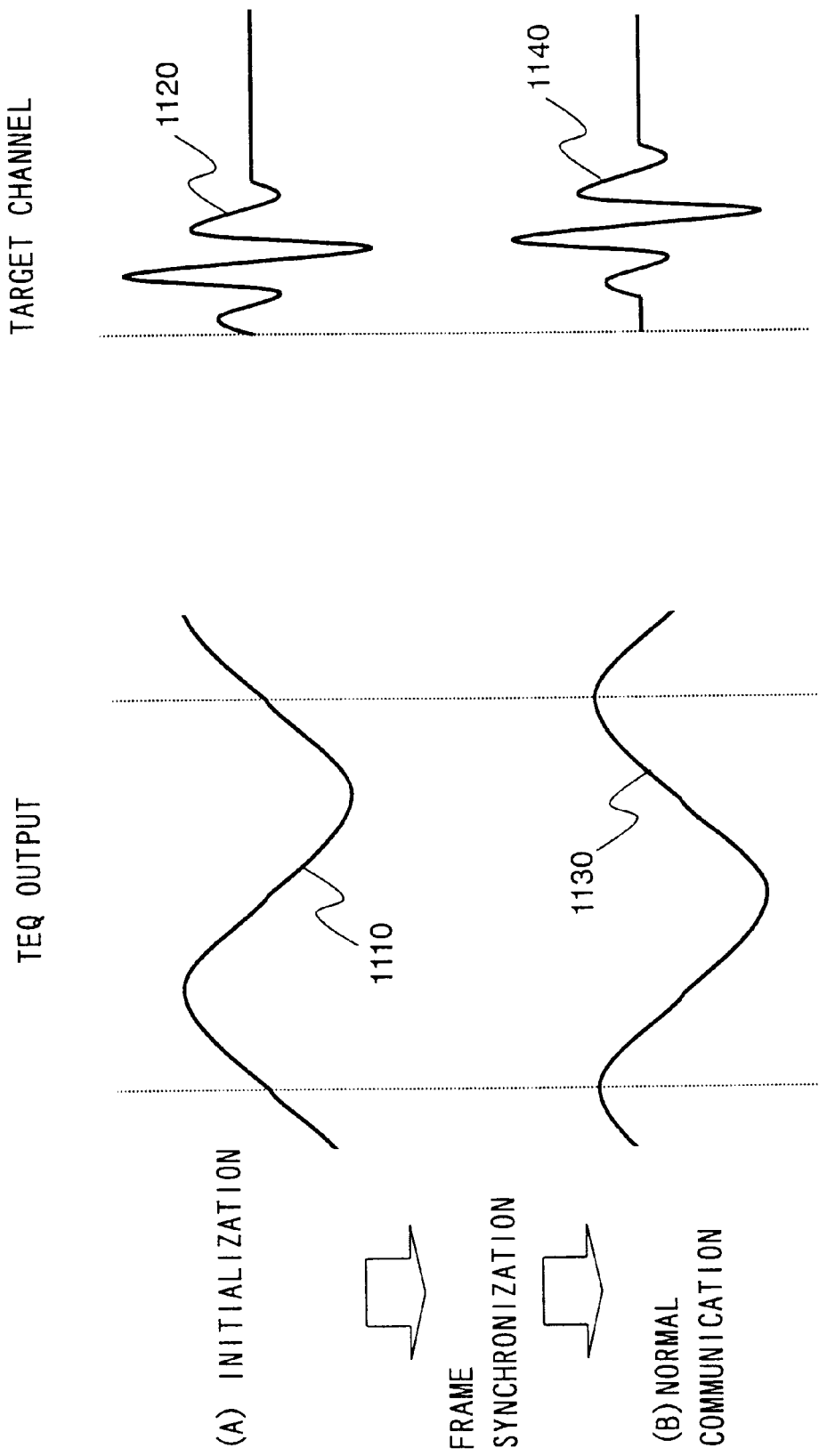
FIG. 3 is a diagram which shows the output of a TEQ unit before and after frame synchronization, together with typical responses of a target channel.

Section (A) of FIG. 3 illustrates the output signal 1110 of the TEQ unit 90 after training, together with an impulse response 1120 of the target channel 620. The training of the TEQ unit 90 is followed by a frame synchronization process. Shown on the left-hand side of section (B) of FIG. 3 is the output signal 1130 of the TEQ unit 90 after frame synchronization. The two waveforms indicate that the frame synchronization has caused a phase shift on the output signal of the TEQ unit 90. That is, the current TEQ output signal 1130 has a different phase, compared with its previous state 1110, although the reference signal (i.e., transmission signal X in this case) has not changed. While it has already been adapted to the line conditions, the target channel 620 does not allow for that phase shift because the training process was done before frame synchronization. In the present embodiment, the controller 1210 manipulates the phase characteristic of the target channel 620 so that it will exhibit a time-shifted impulse response 1140 as shown in section (B) of FIG. 3.

The receiver unit 1200 now migrates to the normal communication mode. It continues to adjust the TEQ unit 90 to keep adaptive to the subscriber line conditions, while holding the current characteristic of the target channel 620. As a possible modification to this embodiment, the characteristics of the target channel 620 may not be completely locked, but allowed to vary within a certain limited range (e.g., such a range where the number of data bits assigned to each carrier is not affected), in addition to keeping the TEQ unit 90 adaptive to the line conditions.

In the above-described first embodiment, the controller 1210 manipulates the characteristics of the target channel 620 when the frame synchronization is established, so that it will exhibit a time-shifted response. It is therefore possible to maintain the quality of communication even if the frame synchronization results in a substantial phase shift. The first embodiment is also advantageous in its simplicity of training control during normal communication sessions. Once the communication is started, the characteristics of the target channel 620 is locked, and only the TEQ unit 90 is subjected to the continued training process. Accordingly, the quality of communication services can be maintained with a minimum processing effort.

Figure 4:
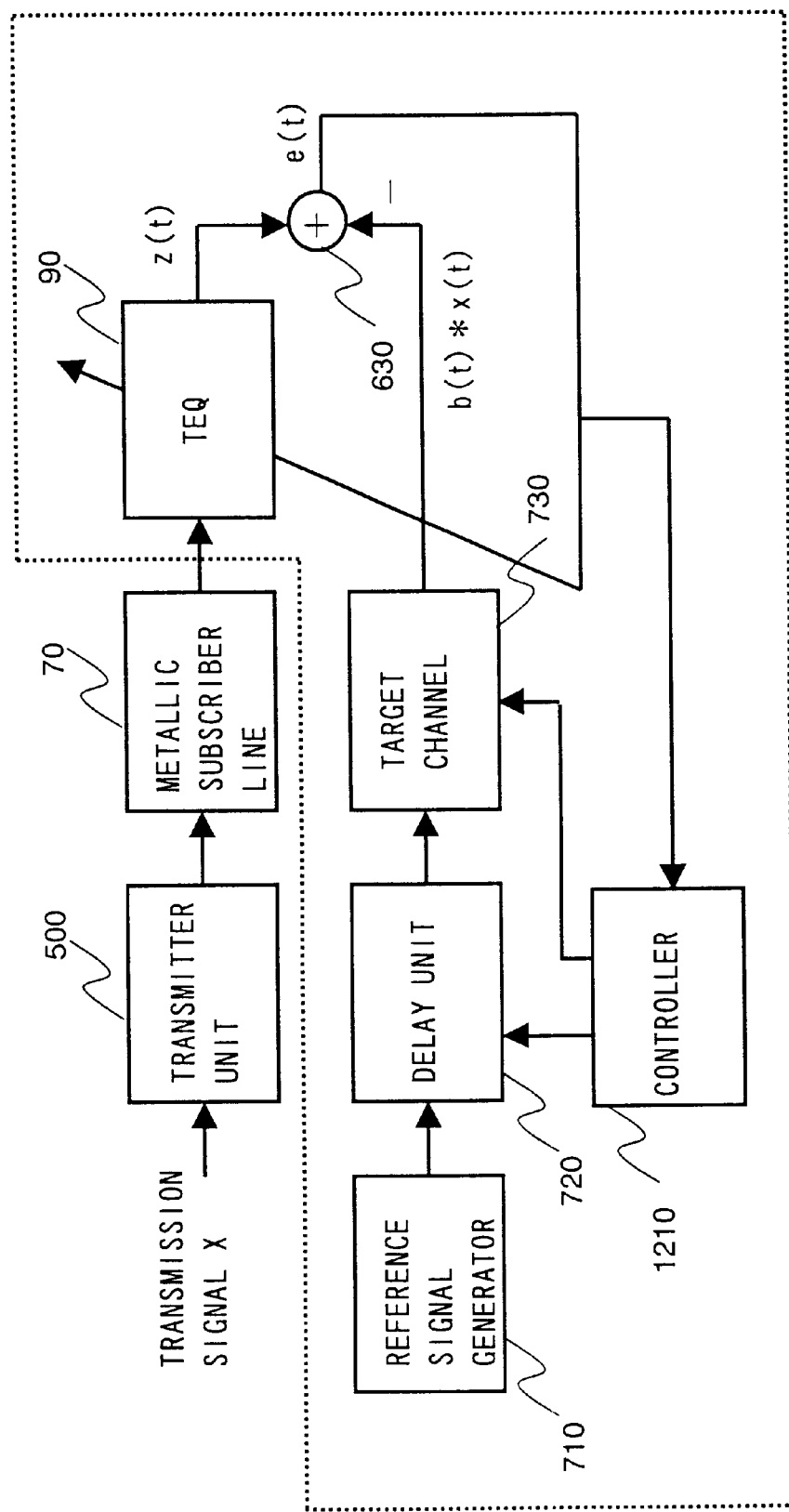
FIG. 4 is a block diagram of a second embodiment of the present invention.

Referring next to FIG. 4, a second embodiment of the present invention will be described below. In contrast to the frequency-domain training proposed in the first embodiment of FIG. 2, the second embodiment presents an implementation of the same functions in the time domain. More specifically, FIG. 4 illustrates a data transmission system which performs training processes in the time domain.

The second embodiment differs from the first embodiment of FIG. 2 in the following points. First, the FFT unit 110 is not present in the training loop. Second, a reference signal generator 710 produces a time-domain reference signal x(t) and a target channel 730 is configured to operate with a time domain signal. Third, a delay unit 720 is placed between the reference signal generator 710 and target channel 730. Further, the controller 1210 controls the delay unit 720 in addition to the target channel 730. The other elements are common to the first embodiment shown in FIG. 2.

In the system of FIG. 4, the reference signal generator denoted at 710 produces a time-domain local reference signal x(t), which is a time-domain representation of the transmission signal X. The delay unit 720 delays the local reference signal x(t) by a predetermined time period. The target channel 730 which corresponds to target channel 3e of FIG. 1 convolves this delayed reference signal x(t) with the target transmission characteristics b (t). The first and second training units 3d and 3c of FIG. 1 are implemented as a combination of the reference signal generator 710, adder 630 and controller 1210.

The second embodiment of the present invention operates as follows. When an initialization sequence is invoked, the receiver unit 1300 accepts an incoming transmission signal X, which is a reference signal produced and transmitted by the sending end. This signal is distorted during the transport over the non-ideal metallic subscriber line 70. The TEQ unit 90 in the receiver unit 1300 convolves this transmission signal X with a predetermined series of coefficients, thus outputting a time domain signal z(t). The reference signal generator 710, on the other hand, locally produces a reference signal x(t) in the time domain, which corresponds to the transmission signal X. The delay unit 720 delays this reference signal x(t) by a predetermined time period. Receiving the delayed reference signal x(t), the target channel 730 convolves it with a series of coefficients b(t) representing the target characteristics. The target channel 730 is actually a band-pass filter implemented by using FIR filter techniques. More specifically, this band-pass filter is constructed as a combination of a low-pass filter representing the metallic subscriber line 70 and a high-pass filter representing the TEQ unit 90.

The adder 630 calculates the difference between the output of the TEQ unit 90 and that of the target channel 730, and supplies the result to the TEQ unit 90 and controller 1210. According to this difference signal, the TEQ unit 90 and target channel 730 are tuned alternately. That is, the characteristics of the TEQ unit 90 and target channel 730 are adjusted so that the output of the adder 630 will become zero. The adjustment stops when the output of the adder 630 falls below a predetermined threshold.

In a normal communication session, the controller 1210 holds the current setup of the delay unit 720 and target channel 730, while the training of the TEQ unit 90 remains active. That is, when the transmitter unit 500 sends a reference transmission signal X during the normal communication mode, the TEQ unit 90 is tuned so that the output of the adder 630 will be zero. In this way, the receiver unit 1300 is free from the intersymbol interference, even if the metallic subscriber line 70 changes in its transmission characteristics.

As described above, the second embodiment of the present invention operates in the time domain, providing the same capabilities as in the first embodiment of FIG. 2. As a possible modification to this embodiment, the characteristics of the target channel 730 may not be completely locked, but allowed to vary within a range where the number of data bits assigned to each carrier is not affected, in addition to keeping the TEQ unit 90 adaptive to the subscriber line conditions.

Figure 5:
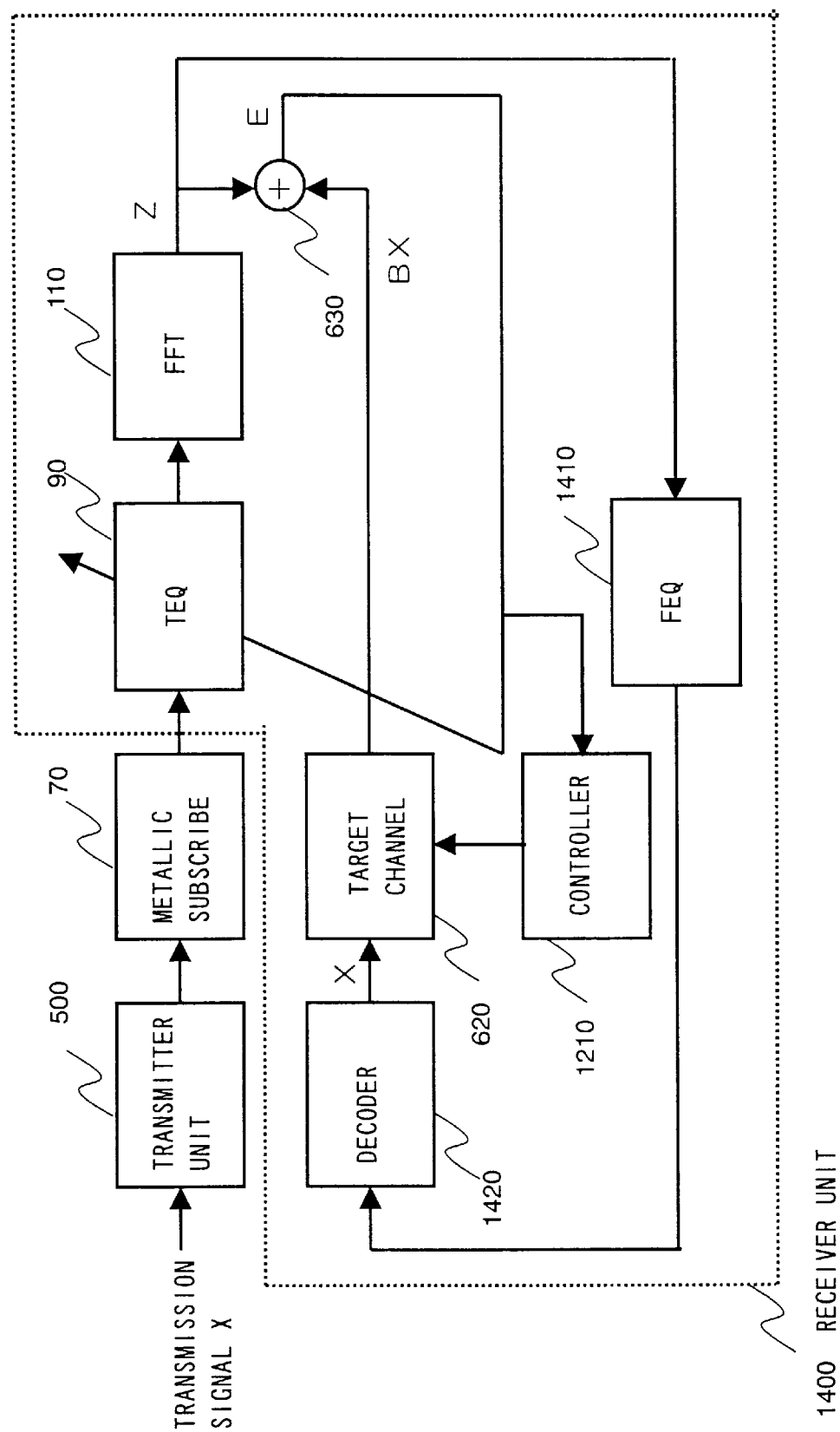
FIG. 5 is a block diagram of a third embodiment of the present invention.

Referring next to FIG. 5, a third embodiment of the present invention will be described below. FIG. 5 shows a specific embodiment which is designed to perform equalizer training with any kind of transmission signal. This third embodiment has some elements that have already been explained in FIG. 2. Thus the following explanation will focus on its distinctive points, while affixing like reference numerals to like elements. In this embodiment the target channel 620 of FIG. 1 corresponds to target channel 3c of FIG. 1 and the first and second training units are implemented as a combination of an FFT 110 (transformation means), a frequency domain equalizer FEQ 1410, decoder 1420 (decoding means), adder 630 and controller 1210. Adder 630 and controller 1210 set up the target channel or the processing unit TEQ unit 90 or both according to a difference between the outputs of the transformation means and the target channel as explained below.

The third embodiment differs from the first embodiment of FIG. 2 in that the reference signal generator 610 is not present, and that an FEQ unit 1410 and a decoder 1420 are involved. The other elements are common to the first embodiment shown in FIG. 2. The FEQ unit 1410 performs equalization on the output signals of the FFT unit 110 so that every frequency component will have a unified characteristic. The decoder 1420 provides a best estimate X for the output signal of the FEQ unit 1410, thus reproducing its original signal.

The third embodiment of the present invention operates as follows. First, when the receiver unit 1400 is at an initialization stage, the TEQ unit 90 applies a prescribed process to the transmission signal X sent from the transmitter unit 500. The FFT unit 110 then converts the output signal of the TEQ unit 90 into a signal in the frequency domain. The FEQ unit 1410 performs equalization on the output signals of the FFT unit 110 so that every frequency component will have a unified characteristic. Receiving the equalized signals from the FEQ unit 1410, the decoder 1420 outputs estimated values X to reproduce the original data signals. The resultant signals are supplied to the target channel 620. Normally, this output signal of the decoder 1420 is identical with the transmission data signal X, or equivalently, the receiver unit 1400 is producing a reference signal X locally. While the receiver unit 1200 of FIG. 2 operates exclusively with a predetermined reference signal X, the receiver unit 1400 of FIG. 5 can use any kind of transmission signal as the reference signal. The target channel 620 applies a predetermined process to the output from decoder 1420; that is, it multiplies individual frequency components by a predetermined series of coefficients. The adder 630 calculates the difference between the output of FFT unit 110 and that of target channel 620, and supplies the result to the TEQ unit 90 and target channel 620 (via the controller 1210). The characteristics of the TEQ unit 90 and target channel 620 are alternately tuned so that the output of the adder 630 will become zero.

The training process is followed by a frame synchronization process. The frame synchronization brings about a certain amount of phase shift in the received signal. Therefore, when the frame synchronization is established, the controller 1210 makes an adjustment to the target channel 620 in order to cancel the phase shift. This adjustment is performed in such a manner that the output of the adder 630 will be zero. Once a communication session is started, the present characteristics of the target channel 620 is locked, and only the TEQ unit 90 is subjected to the continued training process. In this way, the receiver unit 1400 is free from the intersymbol interference, even if the metallic subscriber line 70 shows some variations in its transmission characteristics.

In the above embodiment of the present invention, the receiver unit 1400 employs an FEQ unit 1410 and a decoder 1420 so as to produce a reference signal from the transmission signal X and supply the target channel 620 with the produced signal. This configuration permits the receiver unit 1400 to performs a training process with any kind of transmission signal. That is, it is possible to use data symbols transmitted during a normal communication session to tune the TEQ unit 90 in the frequency domain.

Figure 6:
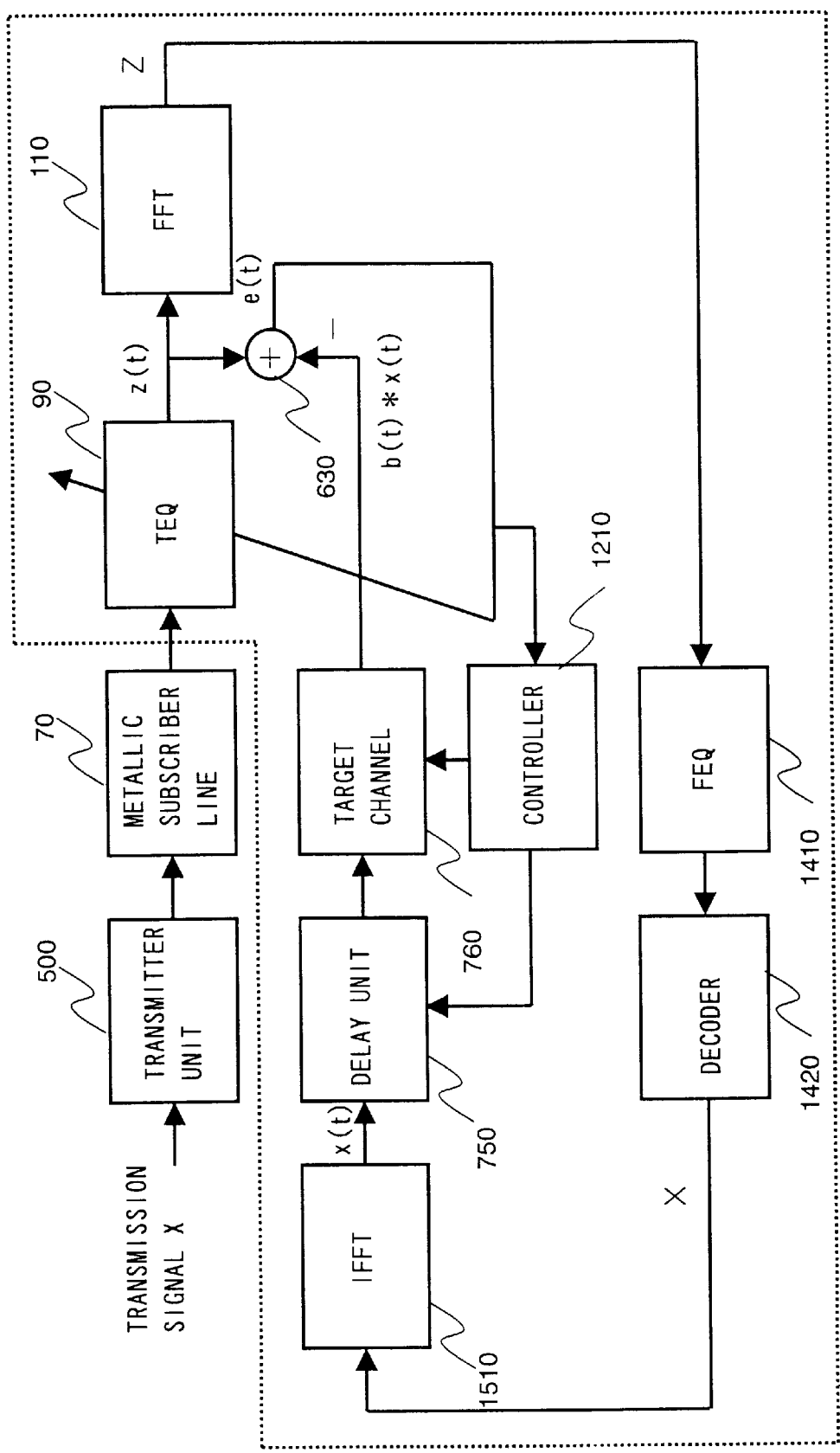
FIG. 6 is a block diagram of a fourth embodiment of the present invention.

Referring next to FIG. 6, a fourth embodiment of the present invention will be described below. As in the third embodiment of FIG. 5, this fourth embodiment can use any kind of incoming signal for equalizer training purposes. The fourth embodiment, however, realizes this function in the time domain.

The fourth embodiment of FIG. 6 is different from the third embodiment of FIG. 5 in the following points. First, the adder 630 is interposed between the TEQ unit 90 and FFT unit 110. Second, an IFFT unit 15 10 and a delay unit 750 are newly added. Third, it employs a target channel 730 that operates with time domain signals. The other elements are common to the third embodiment of FIG. 5. The IFFT unit 1510 receives frequency domain signals from the decoder 1420 and converts them into a time domain signal. The delay unit 750 adds a predetermined amount of delay to the time domain signal x(t) supplied from the IFFT unit 1510. The target channel 760 convolves the delayed time-domain signal x(t) with the target transmission characteristics b(t). The first and second training units are implemented in FIG. 6 as a combination of an FFT unit 110, FEQ unit 1410, decoder 1420, inverse IFFT unit 1510, delay unit 750, adder 630 and controller 1210. FFT unit 110 constitute a first transformation unit which transforms the output of TEQ 90 into a frequency domain signal and IFFT unit 1510 constitute second transformnation unit which transforms original data obtained by decoder 1420 into a time domain signal.

The fourth embodiment of the present invention operates as follows. First, at the initialization stage, the transmission signal X sent from the transmitter unit 500 is subjected to the TEQ unit 90 for equalization in the time domain. The resultant signal z(t) is then supplied to the FFT unit 110 and adder 630. The FFT unit 110 converts the time domain signal z(t) into a frequency domain signal Z. The FEQ unit 1410 performs equalization on the signal Z in the frequency domain. The decoder 1420 outputs an estimated value X for the output signal of the FEQ unit 1410, thus reproducing its original information. The IFFT unit 1510 converts the reproduced data signal X back into a time domain signal x(t). This time-domain output signal x(t) of the IFFT unit 1510 is then given a predetermined time delay by the delay unit 750. The target channel 760 convolves the output signal of the delay unit 750 with the target transmission characteristics b(t). The adder 630 calculates the difference between the outputs of TEQ unit 90 and target channel 760 and supplies the result to the controller 1210 and TEQ unit 90.

The above training process is executed at the initialization stage, in which the target channel 760 and TEQ unit 90 are alternately adjusted. Upon completion of the training process, a frame synchronization process is initiated. When the frame synchronization is established, the controller 1210 makes an adjustment to the delay unit 750, such that the output of the adder 630 will be zero. In this way, the receiver unit 1500 cancels the phase shift that was introduced by the frame synchronization process.

When the system begins a normal communication session after the initialization, the controller 1210 holds the current setup of the delay unit 750 and target channel 760, while the training of the TEQ unit 90 continues. Here, the transmission signal X includes data symbols and synchronization symbols, both of which can be used to train the TEQ unit 90. In this way, the fourth embodiment permits the receiver unit 1500 to performs training of the TEQ unit 90 with any kind of transmission signal.

Figure 7:
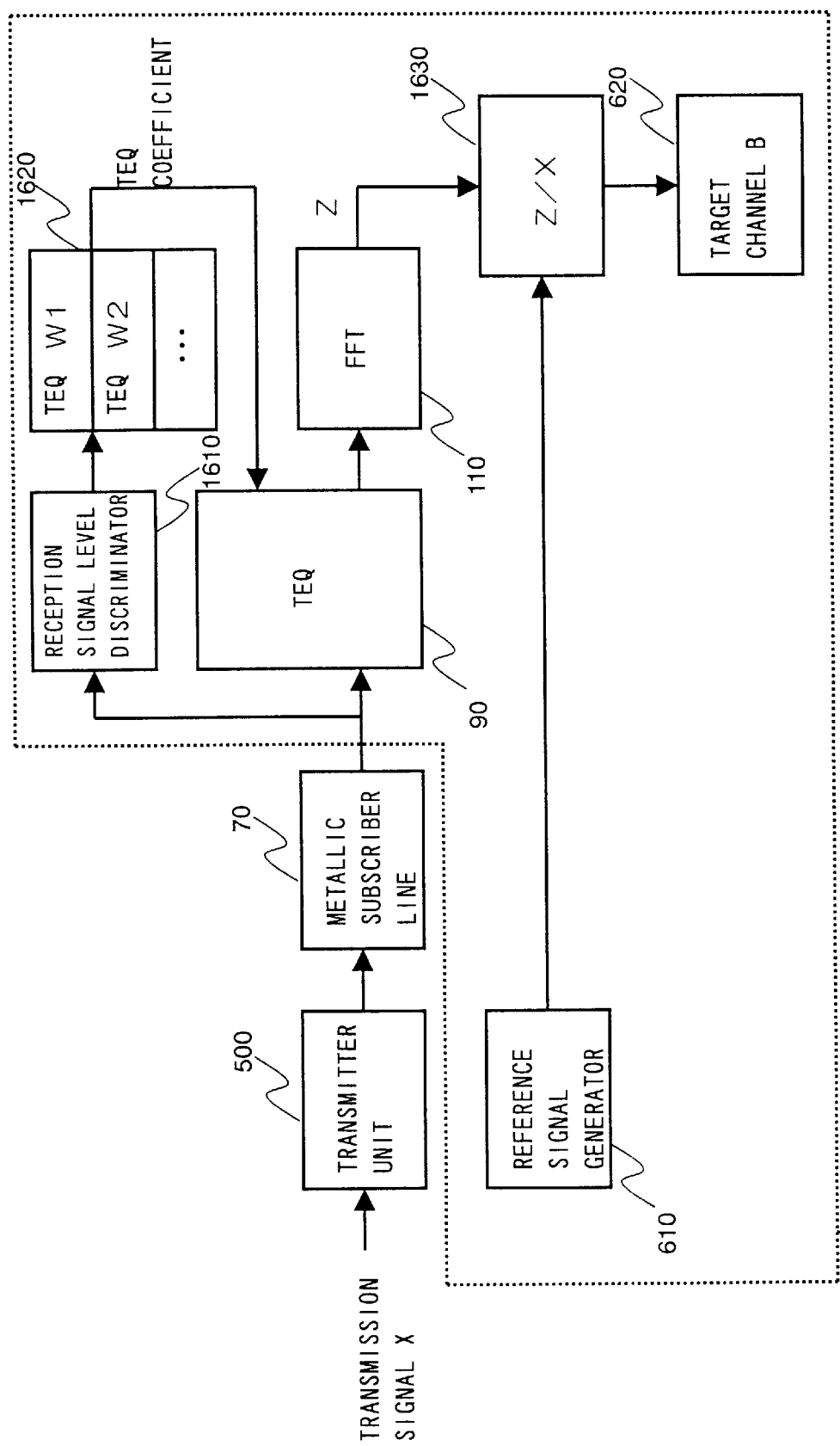
FIG. 7 is a block diagram of a fifth embodiment of the present invention.

Referring next to FIG. 7, a fifth embodiment of the present invention will be described below. FIG. 7 shows a specific embodiment which i s designed to train the equalizer with reduced processing time and load. This fifth embodiment has some elements that have already been explained in FIG. 2. In this embodiment target channel is denoted by reference numeral 620, TEQ 90 processes the data signal received by receiver unit 1600. TEQ coefficient table 1620 is a storage unit which stores a plurality of parameter sets to be set to TEQ 90. A reception signal level discriminator 1610 selects one of the plurality of parameter sets according to a signal reception condition observed by the boundary between the metallic subscriber line 70 and TEQ 90. The TEQ coefficient table 1620 is connected to the reception signal level discriminator and supplying TEQ coefficients specified by the reception signal level discriminator 1610 to the TEQ 90.

The fifth embodiment differs from the first embodiment of FIG. 2 in that the proposed receiver unit 1600 employs a reception signal level discriminator 1610, a TEQ coefficient table 1620, and a divider 1630. To concentrate on the explanation of a new initialization mechanism, FIG. 7 shows only a relevant part of the receiver unit 1600. Other functional blocks of the receiver unit 1600 are omitted for simplicity. The reception signal level discriminator 1610 examines an incoming signal received through the metallic subscriber line 70 and notifies the TEQ coefficient table 1620 of its magnitude. The TEQ coefficient table 1620 stores various reception signal levels and their associated TEQ coefficients. When a specific signal level is reported by the reception signal level discriminator 1610, the TEQ coefficient table 1620 provides relevant TEQ coefficients. The received signal is processed accordingly by the TEQ unit 90 and FFT unit 110. The divider 1630 divides the resultant output signal z by a reference signal X that is locally produced by a reference signal generator 610, and supplies the result to the target channel 620. The target channel 620 configures itself with the output of the divider 1630. Divider 1630 sets up the target channel 620 at an initialization stage.

The fifth embodiment of the present invention operates as follows. Suppose that the transmitter unit 500 begins communication with the receiver unit 1600 and they now invoke an initialization process. The reception signal level discriminator 1610 then determines the magnitude of the received signal and notifies the TEQ coefficient table 1620 of the result. In response to this, the TEQ coefficient table 1620 provides the TEQ unit 90 with a set of TEQ coefficients corresponding to the notified reception signal level.

The above mechanism is based on such a concept that the conditions of the metallic subscriber line 70 can be identified to a certain extent by examining the reception signal level. To implement this concept, the actual relationships between various reception signal levels and suitable TEQ coefficients are previously measured, and a TEQ coefficient table 1620 is formulated according to that experimental results. Accordingly, the TEQ unit 90 is configured with a particular set of TEQ coefficients that is supposed to be most suitable for the current signal level. When the transmitter unit 500 begins to transmit a reference signal X, the TEQ unit 90 receives and convolves it with the TEQ coefficients given above. The FFT unit 110 converts the output of the TEQ unit 90 into a frequency domain signal. The divider 1630 then divides these output signal Z of the FFT unit 110 by a reference signal X locally produced by the reference signal generator 610. The result of this division is supplied to the target channel 620. The target channel 620 configures itself with the output values of the divider 1630. In this way, the TEQ unit 90 and target channel 620 are adapted to the actual transmission characteristics of the metallic subscriber line 70.

When frame synchronization is finished, the receiver unit 1600 cancels the resultant phase shift by readjusting the target channel 620, as described in the first embodiment of FIG. 2. The system then enters a normal communication mode, where the receiver unit 1600 holds the current setup of the target channel 620, while continuing training operations to the TEQ unit 90 in the way as in the first embodiment of FIG. 2.

As seen from the above, the fifth embodiment is distinct from others in that it utilizes the relationships between various reception signal levels and suitable parameters of the TEQ unit 90 which are obtained through actual measurement. Those records are stored in a table, and the TEQ unit 90 is trained on the basis of this table. Further, in the fifth embodiment, the receiver unit 1600 determines parameters of its target channel 620 from the local reference signal and the output of the FFT unit 110. This training process can be executed in a very short time. While the fifth embodiment has been described as using reception signal levels as the determinant of TEQ coefficients, the system may also be configured to determine the coefficients of the TEQ unit 90 on the basis of waveforms or frequency characteristics of incoming signals.

Figure 8:
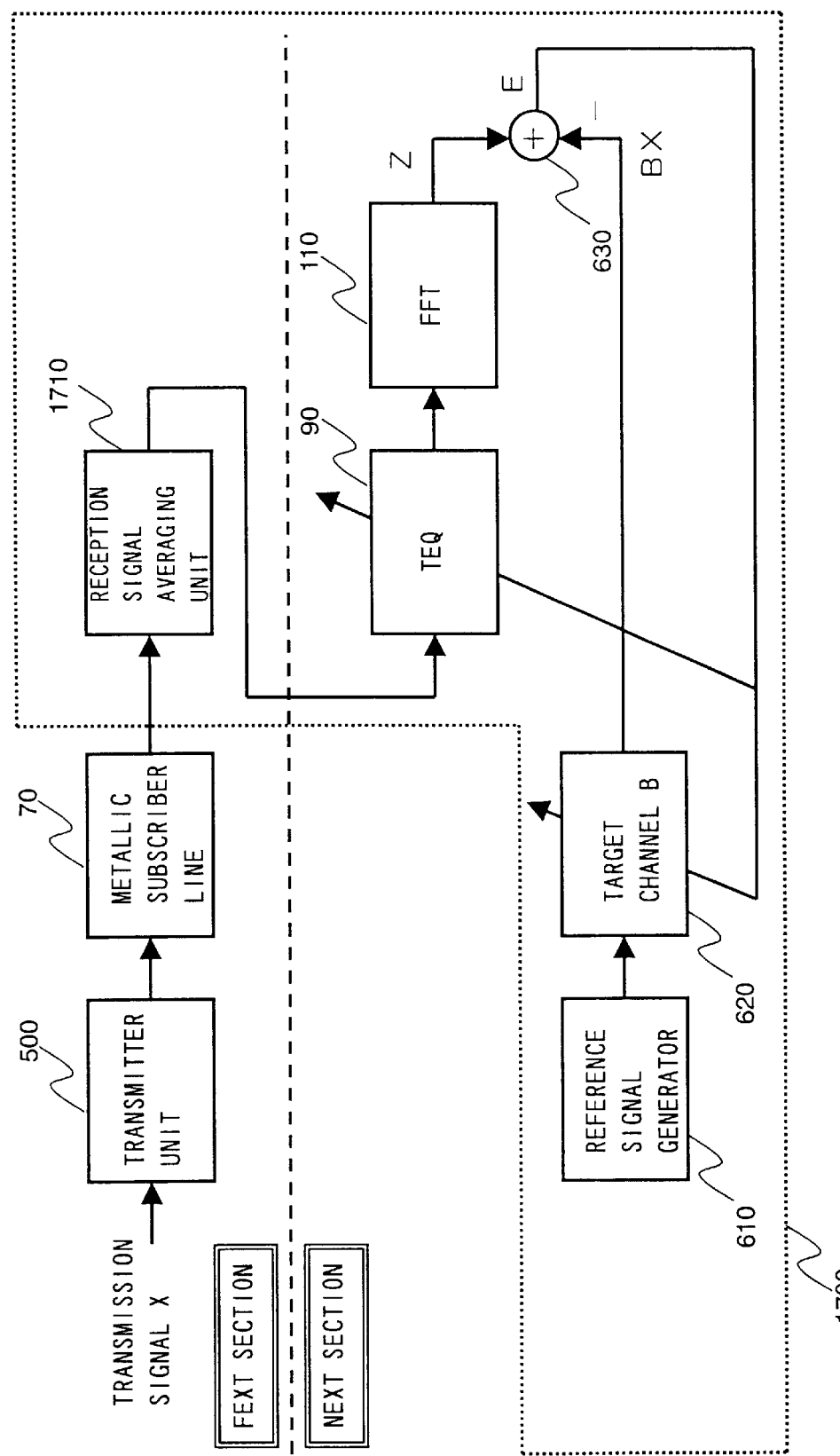
FIG. 8 is a block diagram of a sixth embodiment of the present invention.

Referring next to FIG. 8, a sixth embodiment of the present invention will be described below. FIG. 8 illustrates a specific embodiment which uses FEXT and NEXT periods effectively to accelerate training processes. This sixth embodiment has some elements that have already been explained in the conventional system of FIG. 19. The following explanation will focus on its distinctive points, while affixing like reference numerals to like elements.

Figure 19:
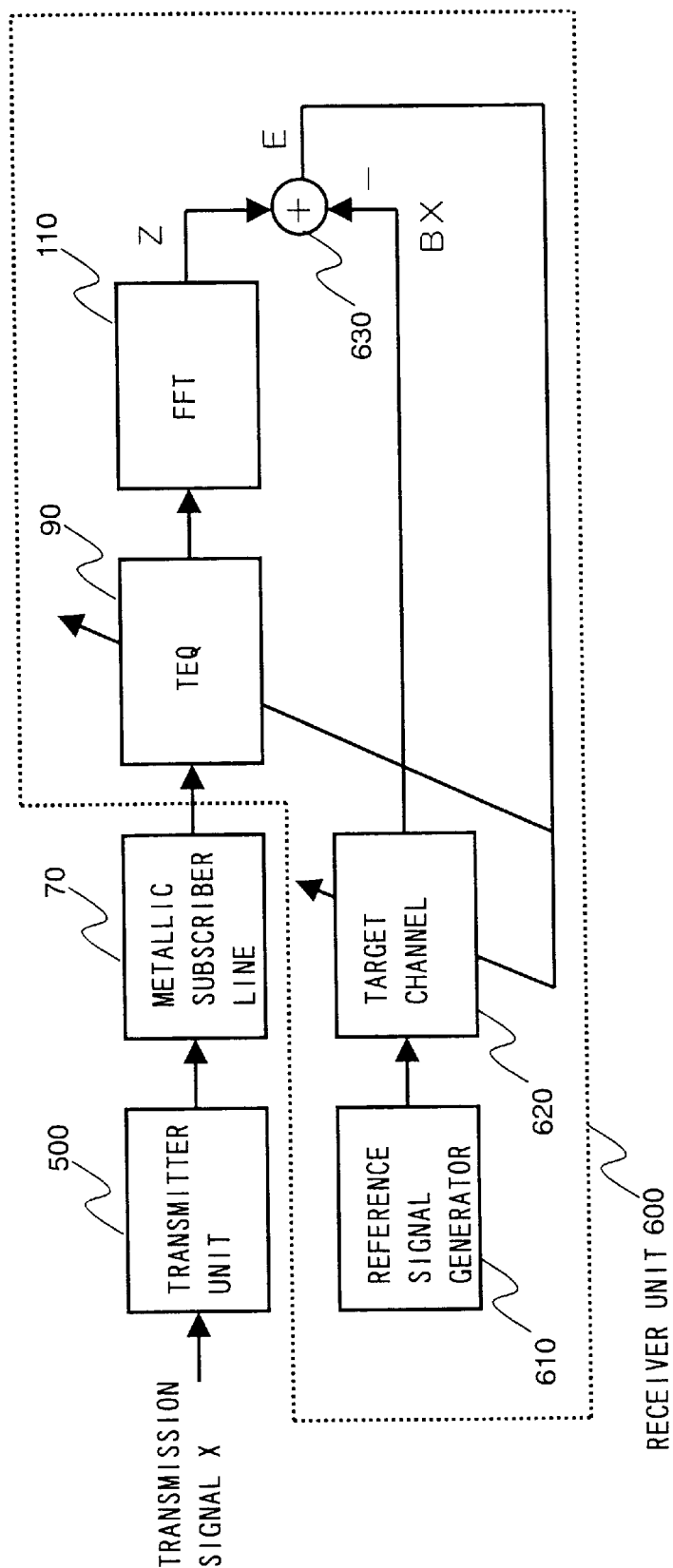
FIG. 19 is a diagram which shows a conventional TEQ training process in the frequency domain.
Figure 20:
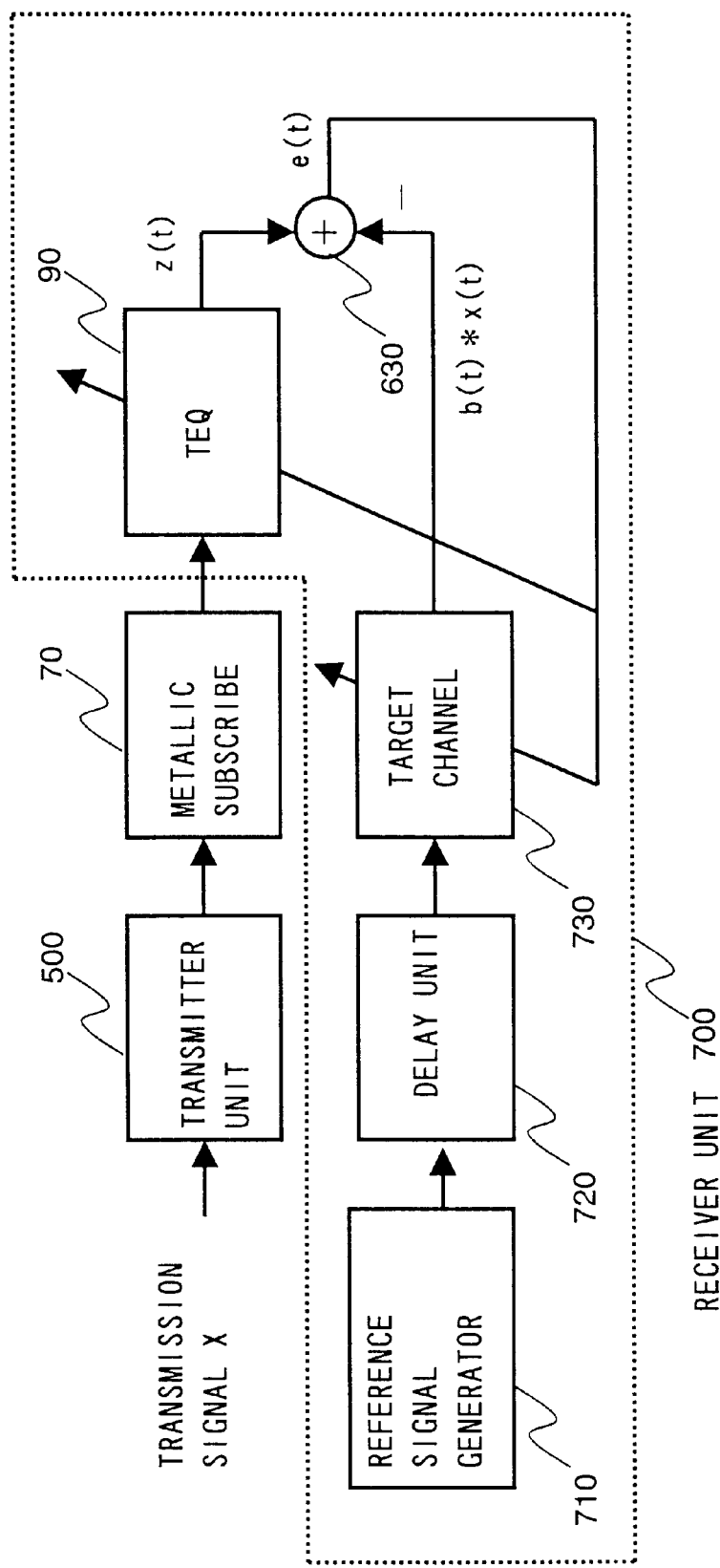
FIG. 20 is a diagram which shows a conventional TEQ training process in the time domain.
Figure 21:
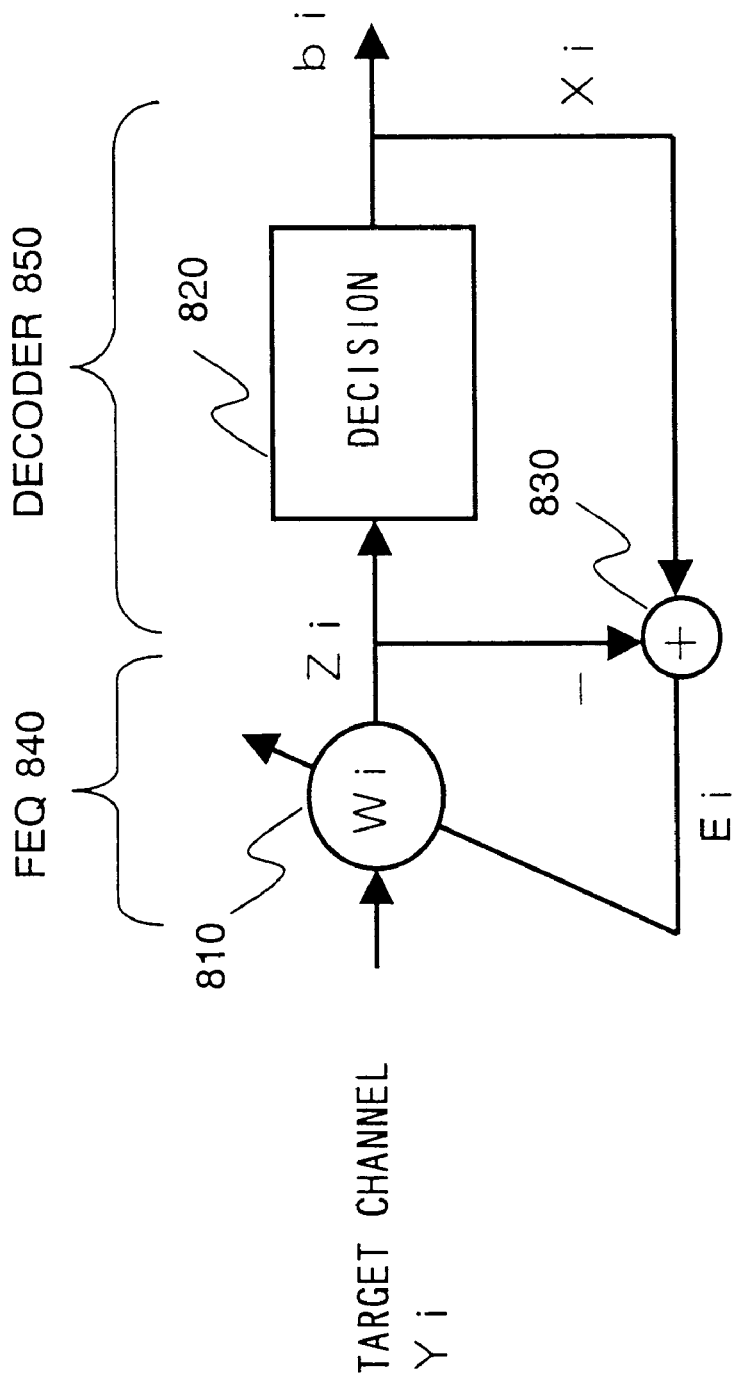
FIG. 21 is a diagram which shows a typical configuration of frequency domain equalizer.
Figure 22:
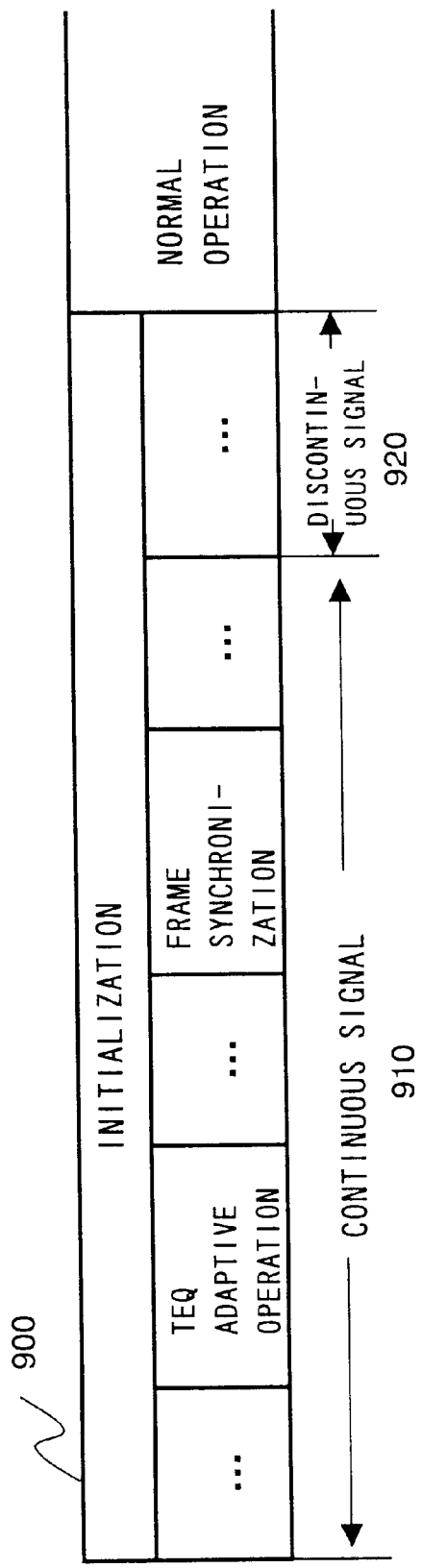
FIG. 22 is a timing diagram which shows how an ADSL unit is initialized.
Figure 23:
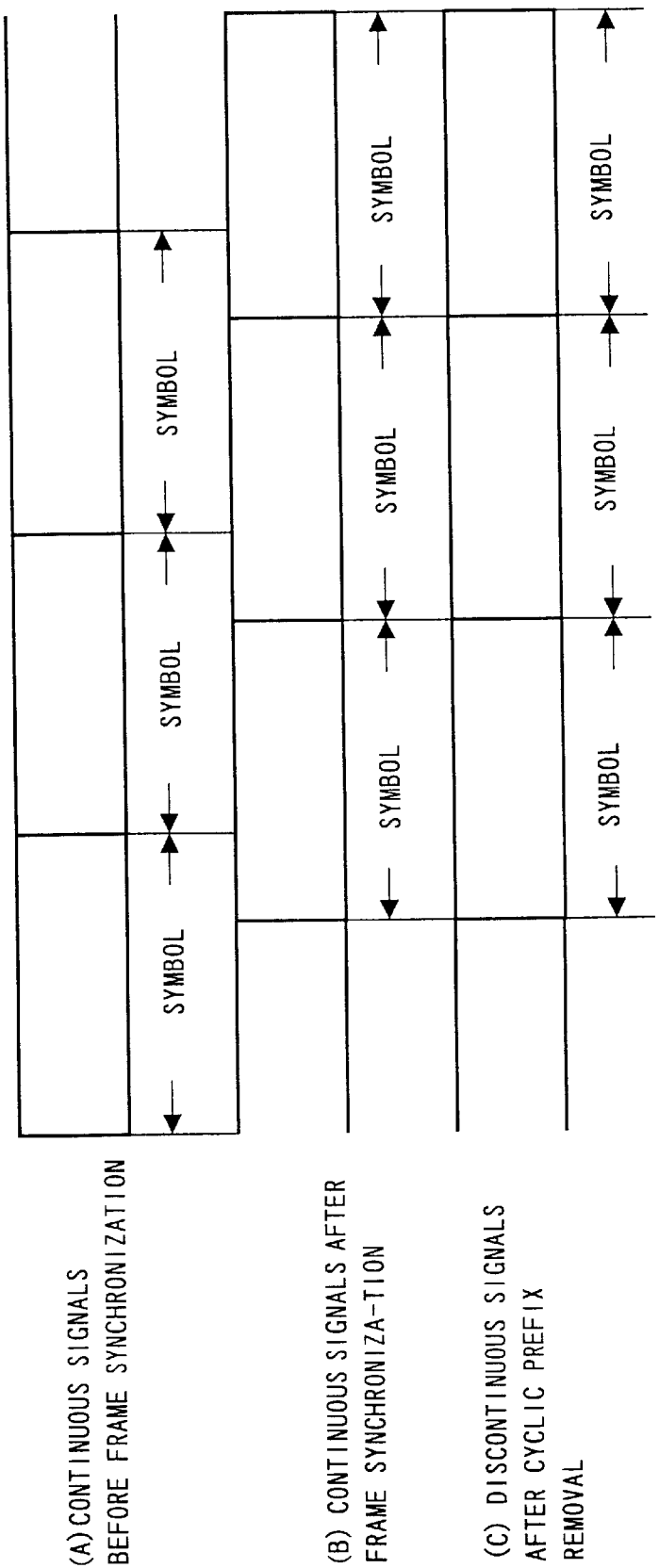
FIG. 23 is a diagram which shows the phase relationships between received signal streams before and after frame synchronization.

The sixth embodiment differs from the conventional system of FIG. 19 in that it advantageously employs a reception signal averaging unit 1710. Further, the functional blocks constituting this system utilizes far-end crosstalk (FEXT) periods and near-end crosstalk (NEXT) periods in a distinctive way as indicated by the broken line in FIG. 8. More specifically, the system shown in FIG. 8 is divided into two parts by the broken line; the functional blocks in the upper part operate in FEXT periods, while those in the lower part operate in NEXT periods. The reception signal averaging unit 1710 extracts reference signals X, which are contained in the received signal, for the duration of several symbol intervals. It calculates the average of them and supplies it to the TEQ unit 90. Other symbols contained in the received signal are delivered intact to the TEQ unit 90.

The sixth embodiment of the present invention operates as follows. When an initialization process begins, the reception signal averaging unit 1710 receives reference signals X for several symbol intervals during a FEXT period and calculates the average of them. The average value is then supplied to the TEQ unit 90 for use in a training operation in the subsequent NEXT period. Here, the TEQ unit 90 and target channel 620 are alternately adjusted so that the adder 630 will output zero. The details of this process will not be described here again, since it is similar to what has been explained in FIG. 19.

In the above-described sixth embodiment, the training of the TEQ unit 90 can be executed during a NEXT period when the system is relatively lightly loaded. In this way, the sixth embodiment takes advantage of the difference between the NEXT and FEXT periods, thus enabling optimal use of system resources. While the sixth embodiment has been described as operating in the frequency domain, it can also be realized in a system that operates in the time domain.

Figure 9:
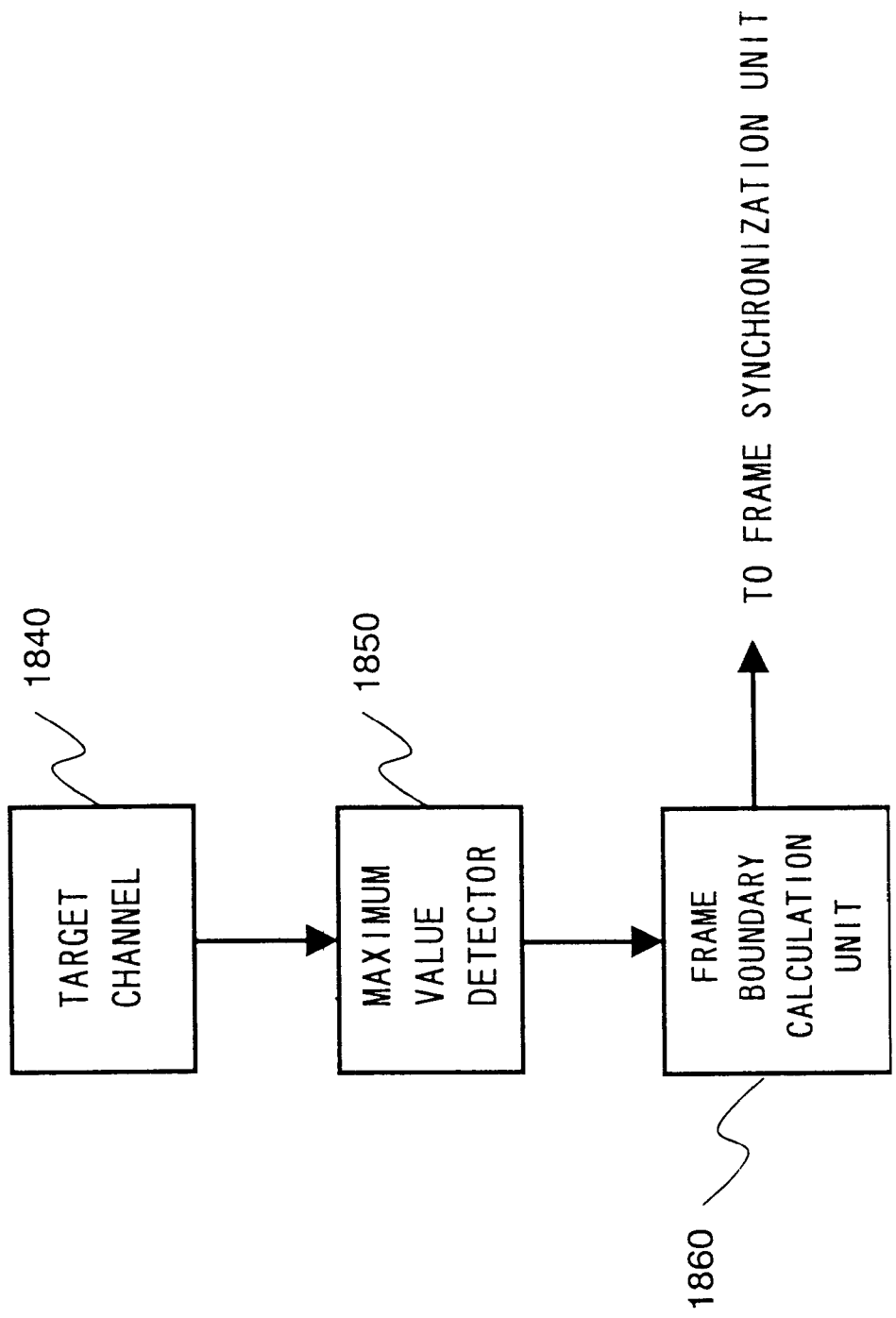
FIG. 9 is a block diagram of a seventh embodiment of the present invention.

Referring next to a block diagram of FIG. 9, a seventh embodiment of the present invention will be described below. FIG. 9 shows the concept of the seventh embodiment which performs frame synchronization with a target channel 1840, which is identical with what was explained as the target channel 620 in FIG. 2. A maximum value detector 1850 is employed to detect the maximum value of the target channel output within a time range whose length is the same as that of a cyclic prefix. A frame boundary calculation unit 1860 detects a particular signal phase which the maximum value detector 1850 indicates as the maximum point. The frame boundary calculation unit 1860 supplies this phase value to a frame synchronization unit (not shown) as a boundary of frames.

The seventh embodiment of the present invention operates as follows. The target channel 620, after being sufficiently trained, shows the same characteristics as the combined characteristic of the metallic subscriber line 70 and TEQ unit 90. This fact suggests that the phase lag of a transmission signal that has been received through the metallic subscriber line 70 and processed by the TEQ unit 90 is equal to that of the target channel 620. Since a frame boundary has to lie on the phase point that is identified by subtracting the TEQ delay from the above phase lag, it is possible to achieve a frame synchronization by: (1) examining the output of the target channel 620 within a specific time range which is as long as a cyclic prefix, (2) finding an exact point at which the target channel 620 shows its peak output, and (3) identifying a frame boundary using the phase of that peak point.

Figure 10:
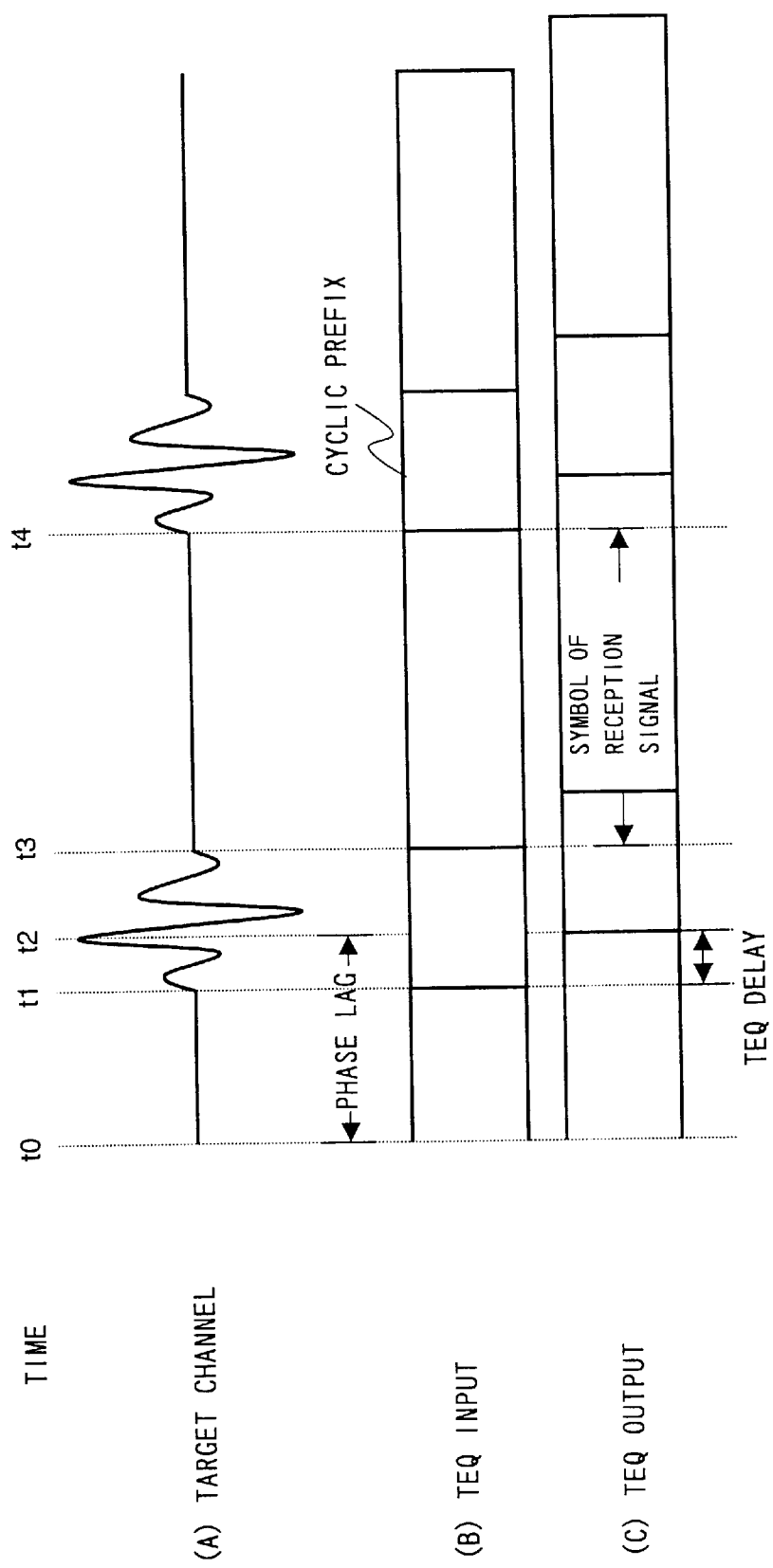
FIG. 10 is a timing diagram which shows how the seventh embodiment of FIG. 9 will operate.

FIG. 10 is a timing diagram which gives more details about how the frame synchronization is performed with the target channel 620. Referring to section (A) of FIG. 10, the phase lag of the target channel 620 is measured as an interval between two time points t0 and t2, where t0 is the time reference and t2 is the time when the target channel 620 shows a peak output in its impulse response. Here, the time range between t1 and t3 corresponds to the cyclic prefix of a DMT symbol in question, within which the maximum output of the target channel 620 can be found. In other words, this time range is where the output of the TEQ unit 90 would show the most dominant effect of intersymbol interference due to the transmission characteristics of the metallic subscriber line 70. The remaining period from t3 to time t4 is regarded as a time range where no intersymbol interference is observed. For this reason, the range between t3 and t4 can be validated as a received DMT symbol.

According to the embodiment of FIG. 9, the maximum value detector 1850 finds a maximum power level that the response of the target channel 620 exhibits within a time range being as long as a cyclic prefix. The frame boundary calculation unit 1860 detects a particular phase at which the maximum value detector 1850 finds a maximum value, and calculates the frame boundary from the detected peak phase lag. The resultant data is supplied to a frame synchronization circuit (not shown). In the example illustrated in FIG. 10, the frame boundary lies at time point t1, which is calculated by subtracting the TEQ delay time from the above peak phase lag.

The present invention establishes frame synchronization in this way, taking advantage of the nature of the target channel 620. In the case that the training of the TEQ unit 90 is performed in the time domain, as in the second embodiment of FIG. 4, the obtained delay parameter is set to the delay unit 720 to cause the frame synchronization to take effect. It may also be possible to divide the output Z of the FFT unit 110 by a reference signal X, as shown in FIG. 7. The result is used to configure the target channel B and establish frame synchronization in the same way as described earlier.

Figure 11:
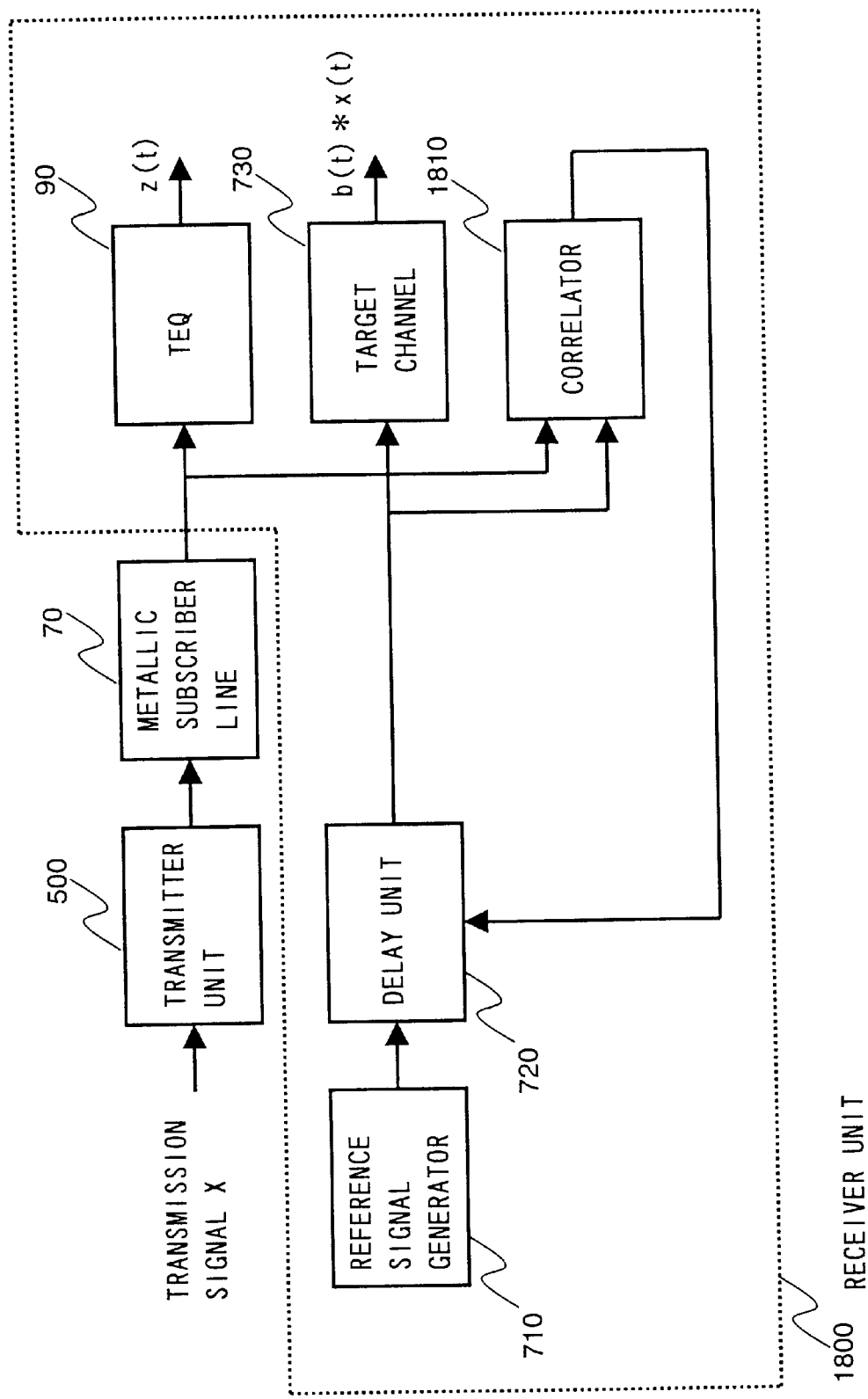
FIG. 11 is a block diagram of an eighth embodiment of the present invention.

Referring next to FIG. 11, an eighth embodiment of the present invention will be described below. FIG. 11 is a block diagram of an embodiment which automatically sets up a delay unit by calculating the delay time in the course of a training operation for the TEQ unit 90. Actually, this eighth embodiment provides a specific method to determine a delay time parameter for the delay unit 720 described earlier in the second embodiment of FIG. 4. Referring back to the block diagram of FIG. 4, the time domain training algorithm is used to tune the TEQ unit 90. According to this algorithm, a local reference signal x(t) produced by the reference signal generation block 710 is fed to the target channel 730 via the delay unit 720. Here, the delay time parameter of this delay unit 720 has to be determined so that the output b(t)*x(t) of the target channel 730 will be in phase with the output z(t) of the TEQ unit 90. Referring to FIG. 11, the eighth embodiment gives an effective solution to this problem by using the correlation between input signals being supplied to the TEQ unit 90 and target channel 730. The receiver unit 1800 thus employs a correlator 1810 which calculates the correlation coefficient between an incoming signal entering the TEQ unit 90 and the output signal of the delay unit 720. According to the result of this calculation, the parameter of the delay unit 720 is determined.

The eighth embodiment of the present invention operates as follows. When a reference signal X is received from the transmitter unit 500, the receiver unit 1800 supplies this signal to its TEQ unit 90 and correlator 1810. On the other hand, the reference signal generator 710 locally produces a like reference signal, and supplies it to the delay unit 720. At this initial stage, the delay unit 720 is configured to have a certain default delay time, which may be zero or any other value. The receiver unit 1800 then calculates the correlation between the received reference signal and the locally generated reference signal that has passed through the delay unit 720.

Figure 12:
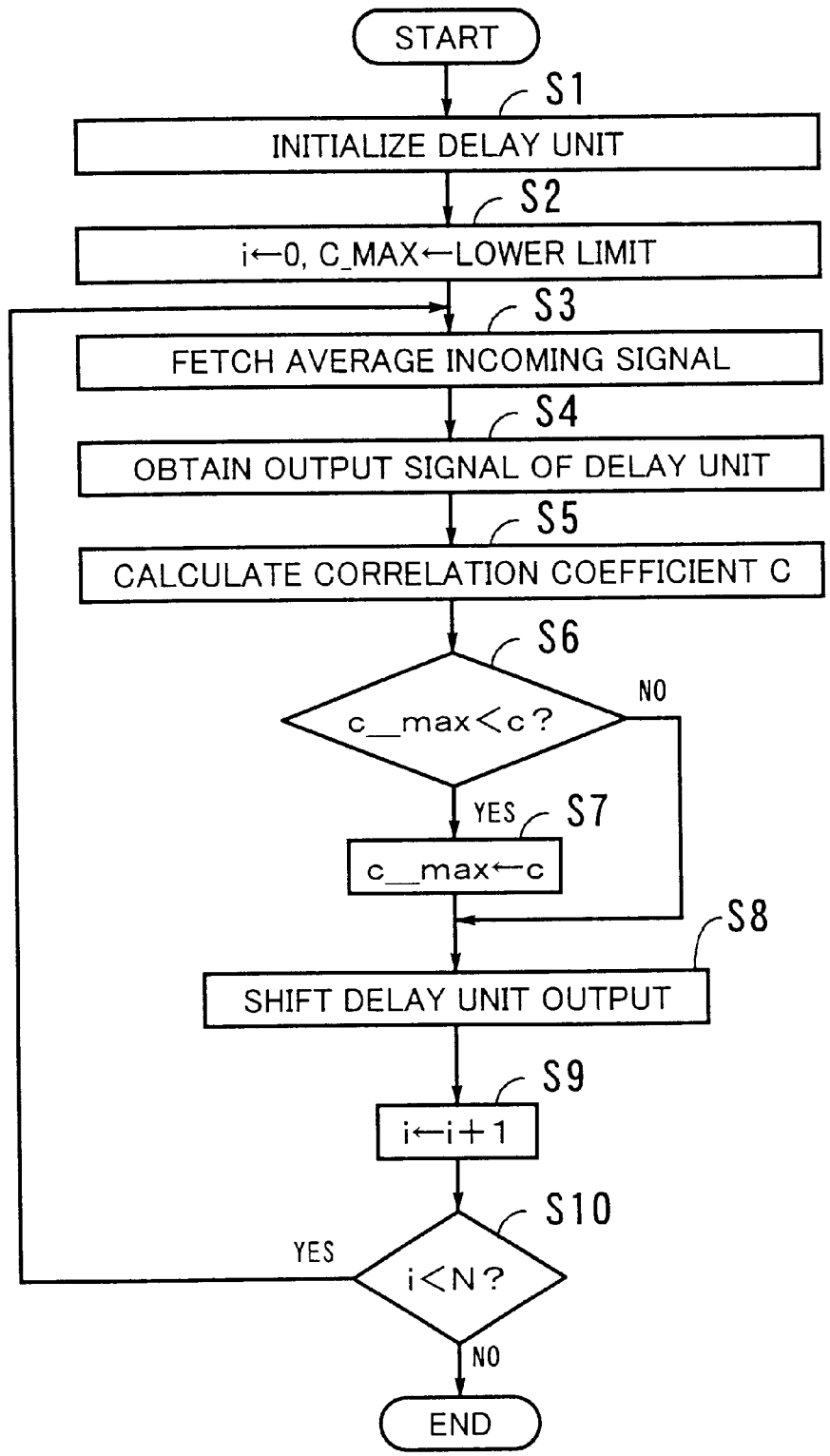
FIG. 12 is a flowchart which shows a process executed by a correlation calculation unit shown in FIG. 11.

FIG. 12 is a flowchart which shows a process executed by a correlator 1810, which comprises the following steps.

(S1) The correlator 1810 initializes the delay unit 720.
(S2) The correlator 1810 initializes two variables i and c_max. Here, the first variable i acts as a loop counter, and its initial value is zero. The second variable c_max will be used in the following steps to hold a maximum value of the correlation coefficient, which starts with a certain allowable minimum value.
(S3) The correlator 1810 fetches an average input signal for one symbol interval, which has been previously sampled at the input of the TEQ unit 90.
(S4) The correlator 1810 obtains the output signal of the delay unit 720 for one symbol interval.
(S5) The correlator 1810 calculates the correlation coefficient c between the two signals obtained at steps S3 and S4.
(S6) The correlator 1810 examines whether the current value of c_max is smaller than the calculated correlation coefficient c. If so, the process advances to step S7. If not, the process skips to step S8.
(S7) The correlator 1810 substitutes c for c_max.
(S8) The correlator 1810 alters the delay time of the output signal that has been captured from the delay unit 720. For example, the delay time parameter of the delay unit 720 is increased by one sampling interval.
(S9) The correlator 1810 increments the loop counter i by one.
(S10) The correlator 1810 tests whether the loop counter i is smaller than a predetermined value N. If so, the process returns to step S3. If not, the process is terminated.

According to the above-described eighth embodiment, the correlation calculation unit 1810 captures the output signal of the delay unit 720 and calculates the correlation with the averaged incoming signal, starting with a certain initial delay time and increasing (or decreasing) the delay time by a predetermined step size, until the repetition reaches N times. During this processing, the correlation calculation unit 1810 finds a particular delay time at which the two signals show the best correlation, and the delay unit 720 can be optimized with this delay time parameter.

Figure 13:
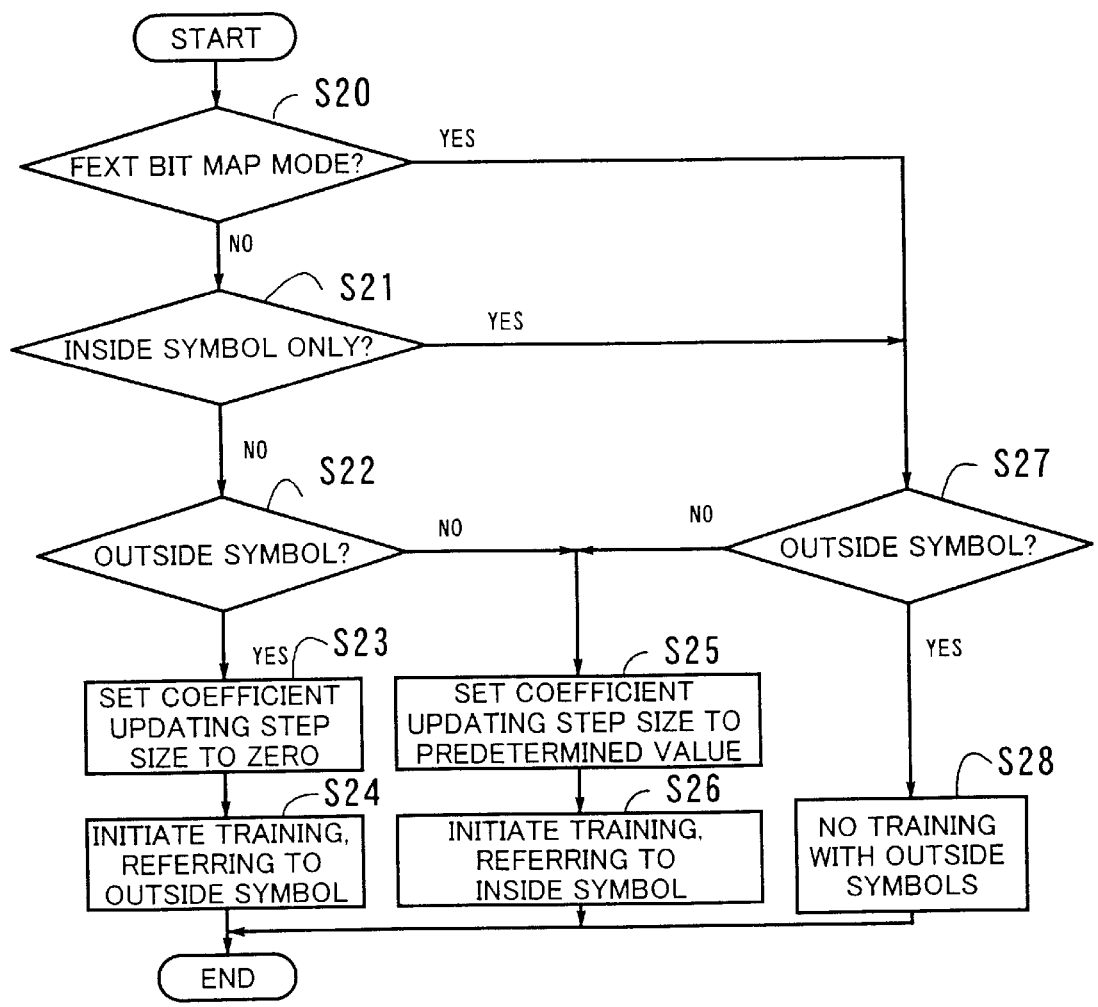
FIG. 13 is a flowchart which explains an example of a training process which allows for NEXT noise interference.
Figure 14:
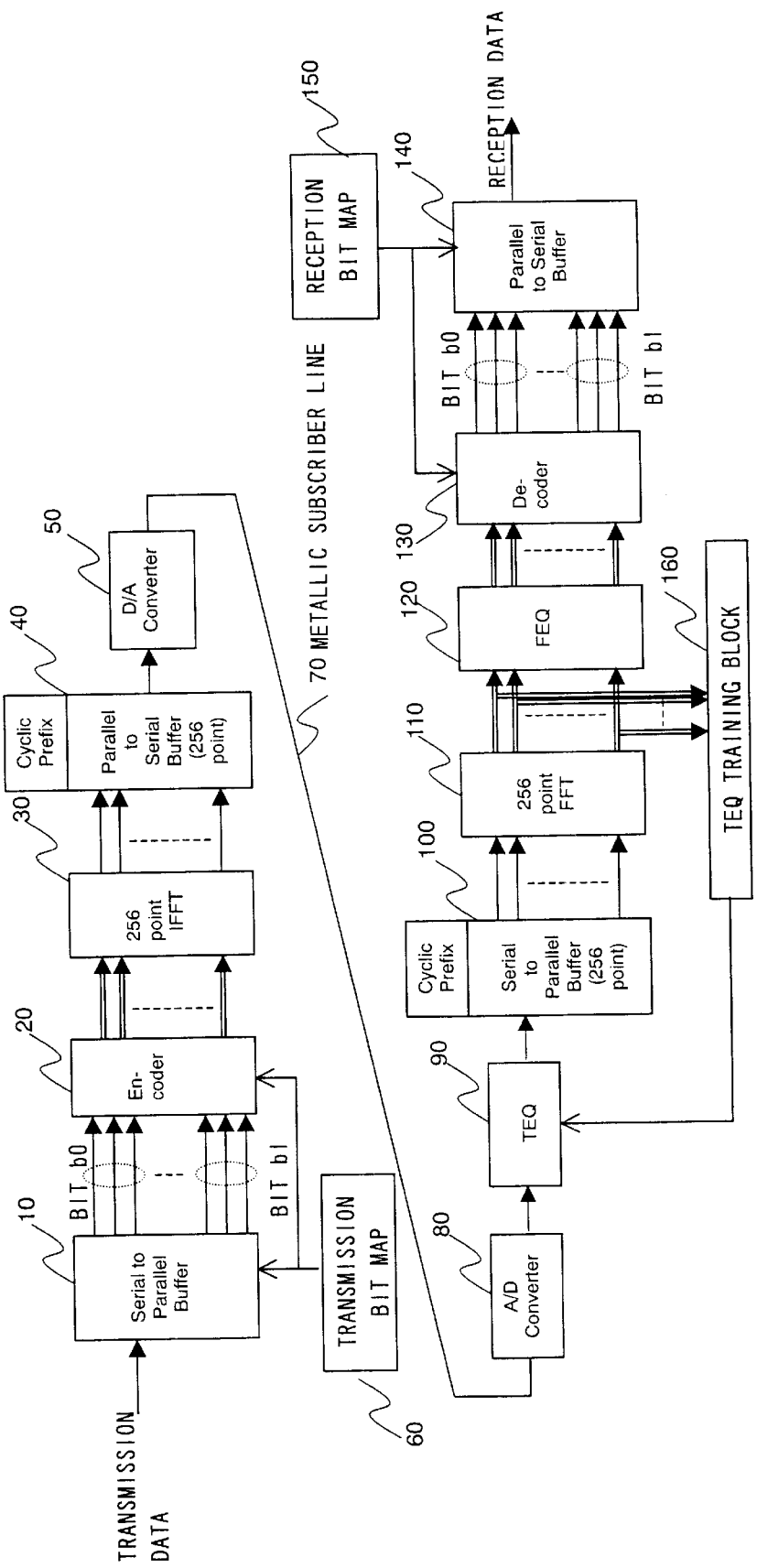
FIG. 14 is a block diagram of a conventional data transmission system.
Figure 15:
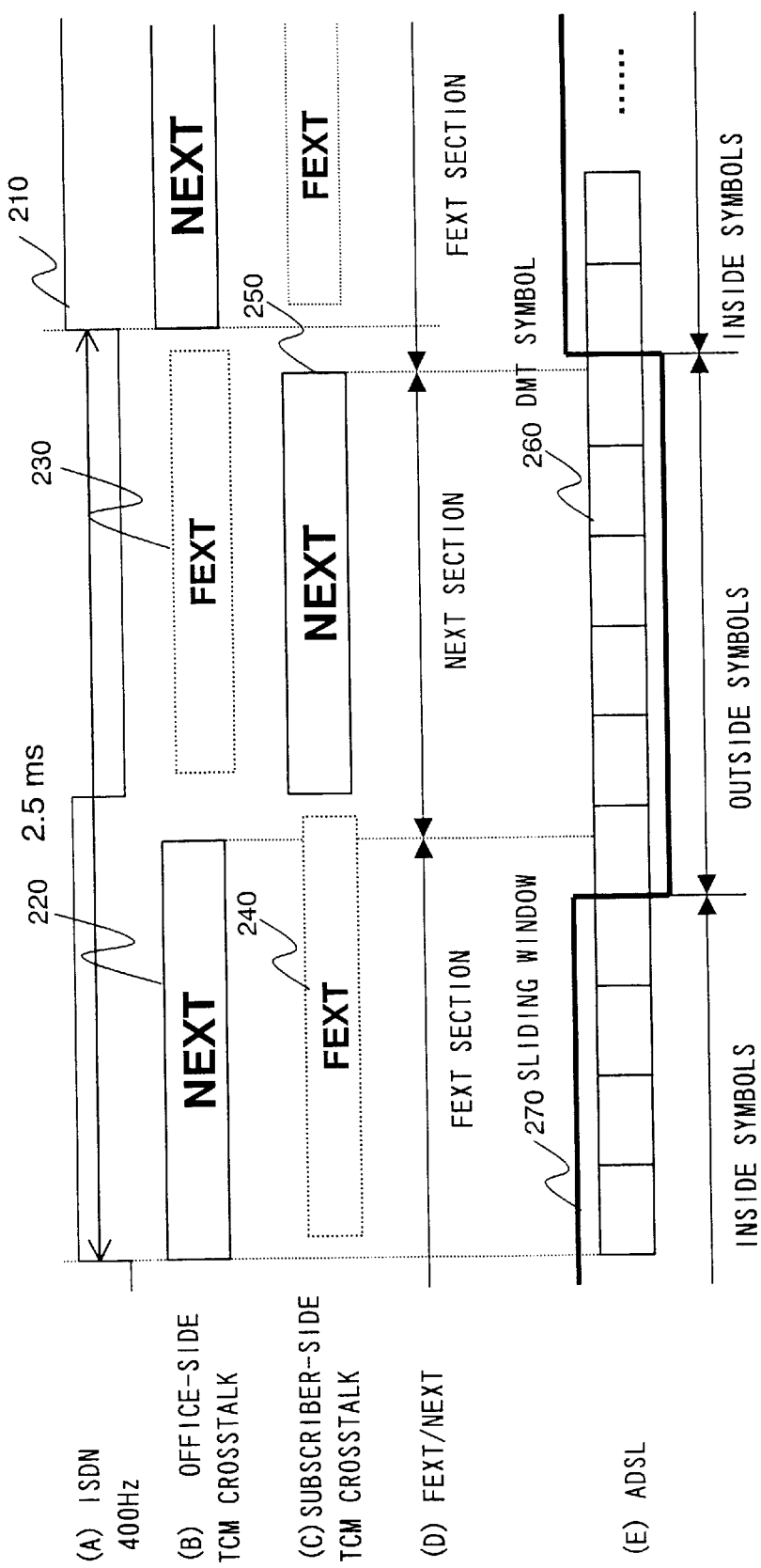
FIG. 15 is a diagram which shows how ADSL signals are affected by TCM-based ISDN services in a normal data communication session.
Figure 16:
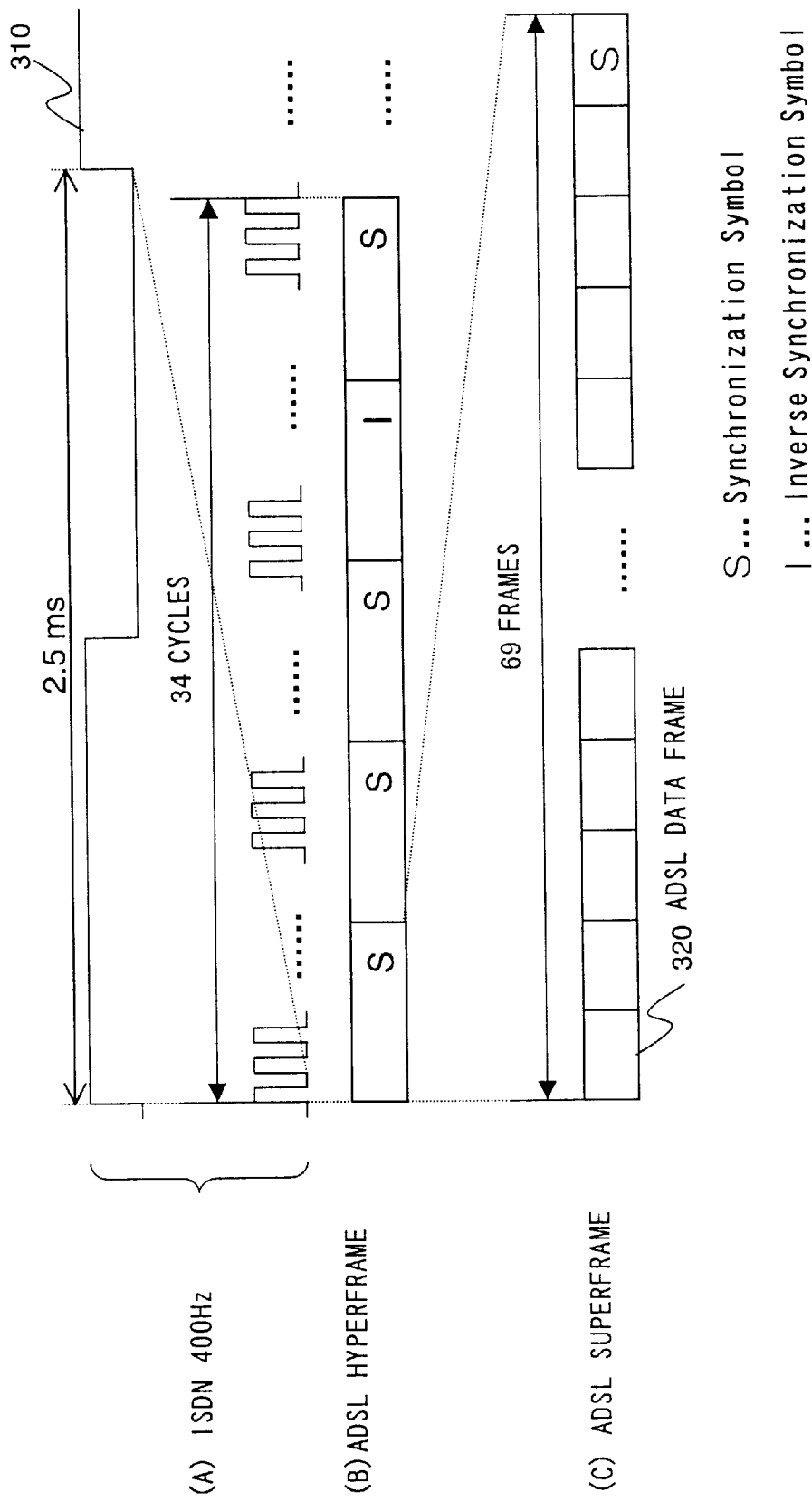
FIG. 16 is a diagram which shows ADSL frame formats.
Figure 17:
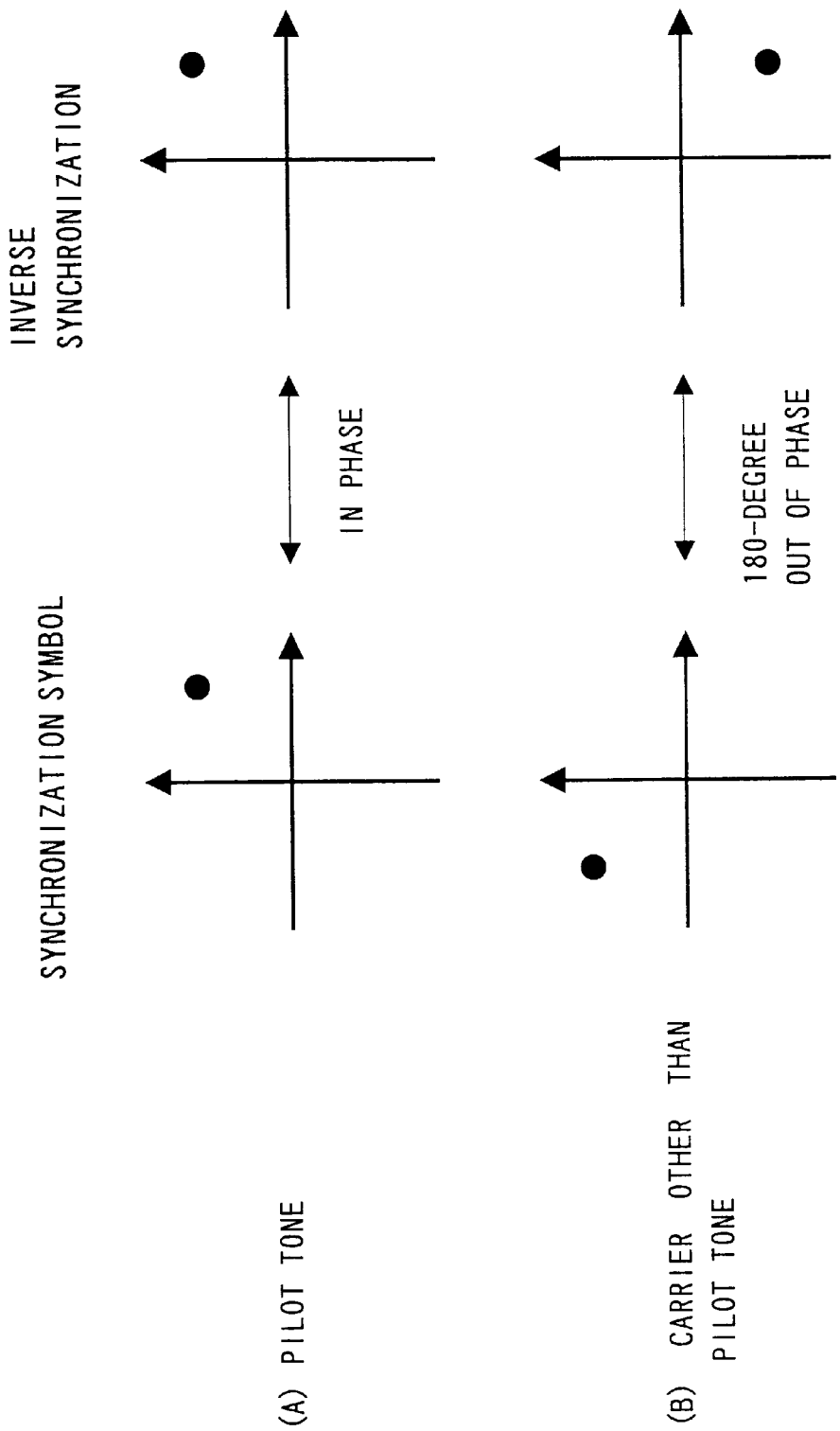
FIG. 17 shows diagrams which depict the relationships between a synchronization symbol and its corresponding inverse synchronization symbol, in the cases of (A) pilot tone and (B) carriers other than the pilot tone.
Figure 18:
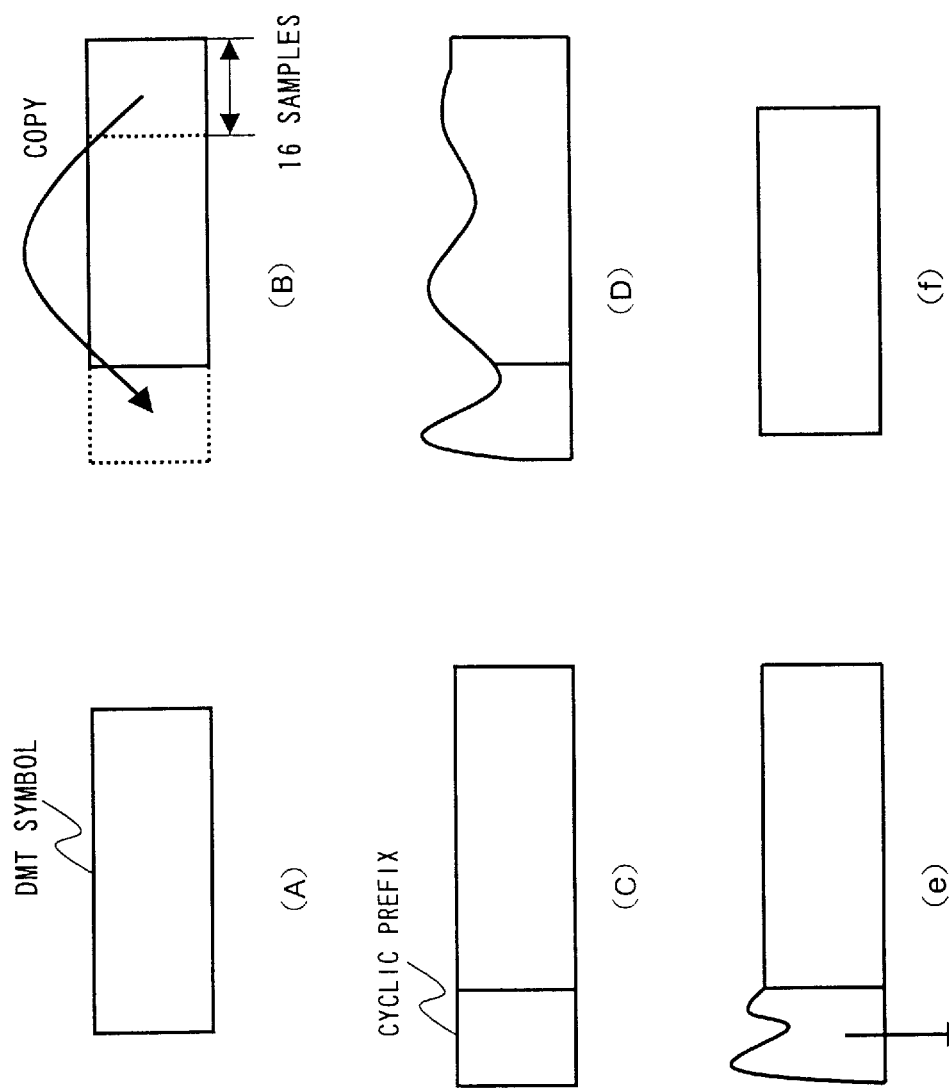
FIG. 18 shows a set of diagrams to explain the operation of a time domain equalizer, which include: (A) original DMT symbol that is given to a parallel-to-serial buffer, (B) prefixing a copy of last 16 samples of a DMT symbol, (C) DMT symbol with a cyclic prefix, (D) receive signal being distorted by intersymbol interference, (E) removal of the cyclic prefix within which the intersymbol interference is confined, and (F) restored DMT symbol being free from intersymbol interference.

Referring next to FIG. 13, the following section will explain how to cope with the problem of crosstalk from TCM-based ISDN services when performing a training process. As previously described in FIG. 15, it is known that ADSL data transport in a normal communication session is affected by adjacent ISDN services in both the upstream and downstream directions. Since the effect of their near end crosstalk (NEXT) noise is particularly serious, the training of the TEQ unit 90 should be carefully designed, taking such time-dependent disturbances.

FIG. 13 is a flowchart which explains an example of such a training process which allows for NEXT noise interference. This process comprises the following steps.

(S20) It is tested whether the receiver unit is operating in the FEXT bit map mode. If so, the process branches to step S27. If not, it advances to step S21.
(S21) It is tested whether the training operation should be executed exclusively with inside symbols.
If so, the process branches to step S27. If not, it advances to step S22.
(S22) It is tested whether the current symbol is an outside symbol. If so, the process advances to step S23. If not, it branches to step S25.
(S23) Coefficient updating step size is set to zero or a sufficiently small value.
Suppose, for example, that the receiver unit is configured to adapt the TEQ unit 90 in the frequency domain as in the embodiment of FIG. 2. In this case, the TEQ unit 90 and target channel 620 are alternately tuned so that the difference E (i.e., the output of the adder 630) will become zero. In many implementations, the difference E is evaluated not immediately, but after being multiplied by a certain factor. This factor is referred to as the coefficient updating step size. If the coefficient updating step size is set to zero, then no training of the TEQ unit 90 will take place.
(S24) A training process is initiated with reference to the outside symbol.
(S25) The coefficient updating step size is set to a predetermined value.
(S26) A training process is initiated with reference to the inside symbol.
(S27) It is tested whether the current symbol is an outside symbol. If so, the process advances to step S28. If not, it branches to step S25.
(S28) No training process is initiated with the current outside symbol.

The above steps will bring about the following outcomes.
(1) If the FEXT bit map mode is currently selected, a training process is initiated, referring only to inside symbols, while skipping outside symbols.
(2) If the dual bit map mode is currently selected, either of the following options can be chosen:
(2-1) perform training only with inside symbols, and
(2-2) perform training with both inside and outside symbols.

When the former option (2-1) is chosen, the training is performed only with inside symbols, and not with outside symbols, as in the case of FEXT bit map mode. When the latter option (2-2) is chosen, the training is performed with inside symbols, as in the option (2-1), and also with outside symbols, setting the coefficient updating step size of the TEQ unit 90 to a very small value or zero. As a result, the training process can be accomplished with a minimized NEXT noise interference.

The above detailed discussion will now be summarized as follows. The present invention ensures data communication with optimized system parameters, which cope with variations in the transmission characteristics of a metallic subscriber line, due to the changes in temperature or the like.

According to the present invention, the equalizer training can be accomplished with reduced processing load and time. This contributes to quick start up of the system. Further, the present invention enables a stable communication session in a TCM crosstalk-prevalent environment.

To make the above advantages possible, the present invention proposes several system structures. First, the present invention provides a data transmission system which uses a subscriber line to transport data from a transmitter unit to a receiver unit. In this system, the transmitter unit comprises: a modulator which applies a prescribed modulation on a data signal to be transmitted; a prefixing unit which adds a cyclic prefix to the data signal modulated by the modulator; a transmitter which sends the data signal with the cyclic prefix over the subscriber line. Further, the receiver unit comprises: a receiver which receives the data signal sent from the transmitter; a processor which processes the data signal received by the receiver so that impairment introduced in the received data signal will be confined within the cyclic prefix, where the impairment has been introduced during the transport of the data signal over the subscriber line; a target channel which provides reference characteristics for use in training the processor; a first training unit which performs training at an initialization stage by tuning both of the target channel and the processor; and a second training unit which performs training by tuning the processor when a normal communication session takes place. This structure of the system enables quick training of the processor not only in an initialization, but also in a normal communication session.

Second, the present invention provides a receiver unit which receives data sent from a transmitter unit over a subscriber line. This receiver unit comprises: a receiver which receives a data signal sent from the transmitter unit; a processor which processes the data signal received by the receiver so that impairment introduced in the received data signal will be confined within a cyclic prefix, where the impairment has been introduced during the transport of the data signal over the subscriber line; a target channel which provides reference characteristics for use in training the processor; a first training unit which performs training at an initialization stage by tuning both of the target channel and the processor; and a second training unit which performs training by tuning the processor when a normal communication session takes place. This structure enables the receiver unit to reliably receive data signals sent from the transmitter unit in a normal communication session.

Third, the present invention provides a data transmission system which uses a subscriber line to transport data from a transmitter unit to a receiver unit. In this system, the transmitter unit comprises: a modulator which applies a prescribed modulation on a data signal to be transmitted; a prefixing unit which adds a cyclic prefix to the data signal modulated by the modulator; a transmitter which sends the data signal with the cyclic prefix over the subscriber line. Further, the receiver unit comprises the following element: a receiver which receives the data signal sent from the transmitter; a processor which processes the data signal received by the receiver so that impairment introduced in the received data signal will be confined within the cyclic prefix, where the impairment has been introduced during the transport of the data signal over the subscriber line; a target channel which provides reference characteristics for use in training the processor; a storage unit which stores a plurality of parameter sets either of which is to be set to the processor; a selection unit which selects one of the plurality of parameter sets, according to a signal reception condition that is observed by the reception unit; and a setting-up unit which sets up the processor with the parameter set selected by the selection unit. This structure of the system enables quick training of the processor.

Finally, the present invention provides a receiver unit which receives data sent from a transmitter unit over a subscriber line. This receiver unit comprises: a receiver which receives a data signal sent from the transmitter unit; a processor which processes the data signal received by the receiver so that impairment introduced in the received data signal will be confined within a cyclic prefix, where the impairment has been introduced during the transport of the data signal over the subscriber line; a storage unit which stores a plurality of parameter sets either of which is to be set to the processor; a selection unit which selects one of the plurality of parameter sets, according to a signal reception condition that is observed by the reception unit; and a setting-up unit which sets up the processor with the parameter set selected by the selection unit. This structure realizes an equalizer training process with reduced processing loads.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data transmission system which uses a subscriber line to transport data from a transmitter unit to a receiver unit, comprising:

modulation means, disposed in the transmitter unit, for applying a prescribed modulation on a data signal to be transmitted;

adding means, disposed in the transmitter unit, for adding a cyclic prefix to the data signal modulated by said modulation means;

transmission means, disposed in the transmitter unit, for sending the data signal with the cyclic prefix over the subscriber line;

reception means, disposed in the receiver unit, for receiving the data signal sent from said transmission means;

processing means, disposed in the receiver unit, for processing the data signal received by said reception means so that impairment introduced in the received data signal will be confined within the cyclic prefix, the impairment having been introduced during the transport of the data signal over the subscriber line;

a target channel, disposed in the receiver unit, which provides reference characteristics for use in training said processing means;

first training means, disposed in the receiver unit, for performing training at an initialization stage by tuning both of said target channel and said processing means; and second training means, disposed in the receiver unit, for performing training by tuning said processing means when a normal communication session takes place.

2. The data transmission system according to claim 1, wherein said second training means performs the training by adjusting parameters that characterizes said processing means, and also adjusting parameters that characterizes said target channel within a range where the number of data bits assigned to each carrier in a transmission symbol.

3. The data transmission system according to claim 1, wherein:

the reference characteristics of said target channel are defined by parameters in a frequency domain; and wherein said first and second training means comprise:

transformation means for transforming a reference signal received from said transmitter unit and processed by said processing means into a frequency domain signal, frequency-domain reference signal generating means for producing a frequency-domain local reference signal which is equivalent to the reference signal that the transmitter unit is sending, and for supplying the produced frequency-domain local reference signal to said target channel, and setting-up means for setting up at least one of said target channel and said processing means according to a difference between the outputs of said transformation means and said target channel.

4. The data transmission system according to claim 3, wherein said setting-up means comprises a controller which changes the parameters of said target channel according to a delay of symbols that constitute the data signal sent from the transmitter unit, before the data transmission system begins a normal communication session.

5. The data transmission system according to claim 1, wherein:

the reference characteristics of said target channel are defined in a time domain; and said first and second training means comprise:

time-domain reference signal generating means for producing a time-domain local reference signal which is equivalent to a reference signal that the transmitter unit is sending, and delaying means for delaying said time-domain local reference signal by a given delay time and supplying the delayed local reference signal to said target channel, and setting-up means for setting up at least one of said target channel and said processing means according to a difference between the output of said target channel and the reference signal that is received from the transmitter unit and processed by said processing means.

6. The data transmission system according to claim 5, wherein said setting-up means comprises a controller which changes the delay time of said delaying means according to a delay time of symbols that constitute the data signal sent from the transmitter unit, before the data transmission system begins a normal communication session.

7. The data transmission system according to claim 6, wherein said controller converts the output of said processing means into a frequency domain signal, divides the frequency domain signal by the time-domain local reference signal, converts the resultant value of said division into a time domain signal, calculates the delay time of symbols, and updates the delay time of said delaying means with the calculated delay time of symbols.

8. The data transmission system according to claim 6, wherein said controller calculates the delay time of the symbols by comparing the output of a front-end interface of said receiver unit and the output of said delaying means, so as to change the delay time of said delaying means with the delay time of the symbols calculated by said controller.

9. The data transmission system according to claim 1, wherein:

the reference characteristics of said target channel are defined in a frequency domain; and said first and second training means comprise:

transformation means for transforming the output of said processing means into a frequency domain signal, decoding means for reproducing original data by decoding the output of said transformation means, and supplying the resultant original data to said target channel, and setting-up means for setting up at least one of said target channel and said processing means according to a difference between the outputs of said transformation means and said target channel.

10. The data transmission system according to claim 1, wherein:

the reference characteristics of said target channel are defined by parameters in a time domain; and said first and second training means comprise:

first transformation means for transforming the output of said processing means into a frequency domain signal, decoding means for reproducing original data by decoding the output of said first transformation means, second transformation means for transforming the original data obtained by said decoding means into a time-domain signal, delaying means for delaying the output of said second transformation means by a predetermined delay time and supplying the resultant signal to said target channel, and setting-up means for setting up at least one of said target channel and said processing means according to a difference between the outputs of said processing means and said target channel.

11. The data transmission system according to claim 1, further comprising averaging means for calculating an average of the data signal received by said reception means in a far-end crosstalk (FEXT) period, wherein said first or second training means performs training in a near-end crosstalk (NEXT) period by tuning at least one of said target channel and said processing means with reference to the average of the data signal calculated by said averaging means.

12. The data transmission system according to claim 1, wherein:

in a far-end crosstalk bit map mode, said second training means performs training of said processing means, referring to inside symbols;

in a dual bit map mode, said second training means performs training of said processing means, referring only to inside symbols, or successively referring to both inside and outside symbols.

13. The data transmission system according to claim 12, wherein said second training means sets coefficient updating step size to the vicinity of zero, when performing the training of said processing means, successively referring to both inside and outside symbols in the dual bit map mode.

14. The data transmission system according to claim 1, further comprising frequency domain equalization means for equalizing the received data signal to compensate for the impairment introduced during the transport of the data signal over the subscriber line, wherein, in a far-end crosstalk bit map mode, said second training means performs training of said frequency domain equalization means, referring to inside symbols, and wherein, in a dual bit map mode, said second training means performs training of said frequency domain equalization means, referring only to inside symbols, or successively referring to both inside and outside symbols.

15. The data transmission system according to claim 14, wherein said second training means sets coefficient updating step size to the vicinity of zero, when performing the training of said frequency domain equalization means, successively referring to both inside and outside symbols in the dual bit map mode.

16. The data transmission system according to claim 1, further comprising:

storage means, disposed in the receiver unit, for storing a plurality of parameter sets either of which is to be set to said processing means;

selection means, disposed in the receiver unit, for selecting one of the plurality of parameter sets, according to a signal reception condition that is observed by said reception means; and setting-up means, disposed in the receiver unit, for setting up said processing means with the parameter set selected by said selection means.

17. The data transmission system according to claim 16, further comprising:

another setting-up means for setting up said target channel at an initialization stage; and frequency domain reference signal generating means for generating a reference signal in a frequency domain, wherein said another setting-up means divides the output of said processing means by the frequency domain reference signal and sets up said target channel according to the result of said division, the output of said processing means being transformed into a frequency domain signal in advance of said division.

18. A receiver unit which receives data sent from a transmitter unit over a subscriber line, comprising:

reception means for receiving a data signal sent from the transmitter unit;

processing means for processing the data signal received by said reception means so that impairment introduced in the received data signal will be confined within a cyclic prefix, the impairment having been introduced during the transport of the data signal over the subscriber line;

a target channel which provides reference characteristics for use in training said processing means;

first training means for performing training at an initialization stage by tuning both of said target channel and said processing means; and second training means for performing training by tuning said processing means when a normal communication session takes place.

* * * * *